United States Patent
Chung et al.

(10) Patent No.: US 11,539,417 B2
(45) Date of Patent: Dec. 27, 2022

(54) METHOD FOR TRANSMITTING/RECEIVING CHANNEL STATE INFORMATION IN WIRELESS COMMUNICATION SYSTEM, AND DEVICE THEREFOR

(71) Applicant: LG ELECTRONICS INC., Seoul (KR)

(72) Inventors: Jaehoon Chung, Seoul (KR); Jiwon Kang, Seoul (KR); Haewook Park, Seoul (KR)

(73) Assignee: LG Electronics Inc., Seoul (KR)

(*) Notice: Subject to any disclaimer, the term of this patent is extended or adjusted under 35 U.S.C. 154(b) by 41 days.

(21) Appl. No.: 17/263,372

(22) PCT Filed: Jul. 26, 2019

(86) PCT No.: PCT/KR2019/009303
§ 371 (c)(1),
(2) Date: Jan. 26, 2021

(87) PCT Pub. No.: WO2020/027503
PCT Pub. Date: Feb. 6, 2020

(65) Prior Publication Data
US 2021/0143886 A1  May 13, 2021

(30) Foreign Application Priority Data

Jul. 30, 2018 (KR) .................. 10-2018-0088522
Jun. 25, 2019 (KR) .................. 10-2019-0075390

(51) Int. Cl.
*H04B 7/06* (2006.01)
*H04B 7/0456* (2017.01)
(Continued)

(52) U.S. Cl.
CPC ......... *H04B 7/0626* (2013.01); *H04B 7/0486* (2013.01); *H04B 7/0632* (2013.01);
(Continued)

(58) Field of Classification Search
CPC .. H04B 7/0626; H04B 7/0486; H04B 7/0632; H04B 7/063; H04B 7/0456;
(Continued)

(56) References Cited

U.S. PATENT DOCUMENTS

2014/0036796 A1* 2/2014 Etemad .................. H04L 65/80
370/329
2016/0227428 A1 8/2016 Novlan et al.

FOREIGN PATENT DOCUMENTS

KR   10-2012-0109546    10/2012
KR   10-2017-0137044    12/2017
WO   WO-2013191441 A1 * 12/2013 ............. H04B 7/024

OTHER PUBLICATIONS

3GPP TSG RAN WG1 Meeting 90bis (R1-1717837) by Ericsson (Year: 2017).*

(Continued)

*Primary Examiner* — Thai Nguyen
(74) *Attorney, Agent, or Firm* — Dentons US LLP

(57) ABSTRACT

The present disclosure provides a method for transmitting and receiving channel state information (CSI) in a wireless communication system and a device supporting the same. Particularly, a method for reporting channel state information (CSI) performed by a user equipment (UE) supported by multiple base stations in a wireless communication system may include receiving CSI related configuration information for the multiple base stations; receiving a reference signal from the multiple base stations; generating CSI based on a CSI omission rule; and transmitting the CSI to at least one base station among the multiple base stations, wherein the CSI may include information for multiple channels configured, and wherein the CSI omission rule may be determined based on at least one of i) a type of the CSI, (Continued)

ii) a part of the CSI, iii) priority information among CSI parameters and/or iv) priority information among the multiple base stations.

12 Claims, 18 Drawing Sheets

(51) Int. Cl.
  *H04W 72/04* (2009.01)
  *H04W 72/10* (2009.01)
  *H04W 72/12* (2009.01)
(52) U.S. Cl.
  CPC ... *H04W 72/0413* (2013.01); *H04W 72/0453* (2013.01); *H04W 72/10* (2013.01); *H04W 72/1263* (2013.01)
(58) Field of Classification Search
  CPC .... H04B 7/0639; H04B 7/024; H04B 17/373; H04B 7/2662; H04B 7/0814; H04W 72/0413; H04W 72/0453; H04W 72/10; H04W 72/1263; H04W 24/10; H04W 72/044; H04L 5/00
  See application file for complete search history.

(56) References Cited

OTHER PUBLICATIONS

Samsung et al., "WF for Open Issues on CSI Reporting," R1-1716901, 3GPP TSG RAN WG1 NR-AH3, Nagoya, Japan, Sep. 25, 2017, See p. 6.

Ericsson, "Summary of views on CSI reporting," R1-1721451, 3GPP TSG RAN WG1 Meeting #91, Reno, USA, Nov. 29, 2017, See p. 1.

* cited by examiner

[FIG. 1]
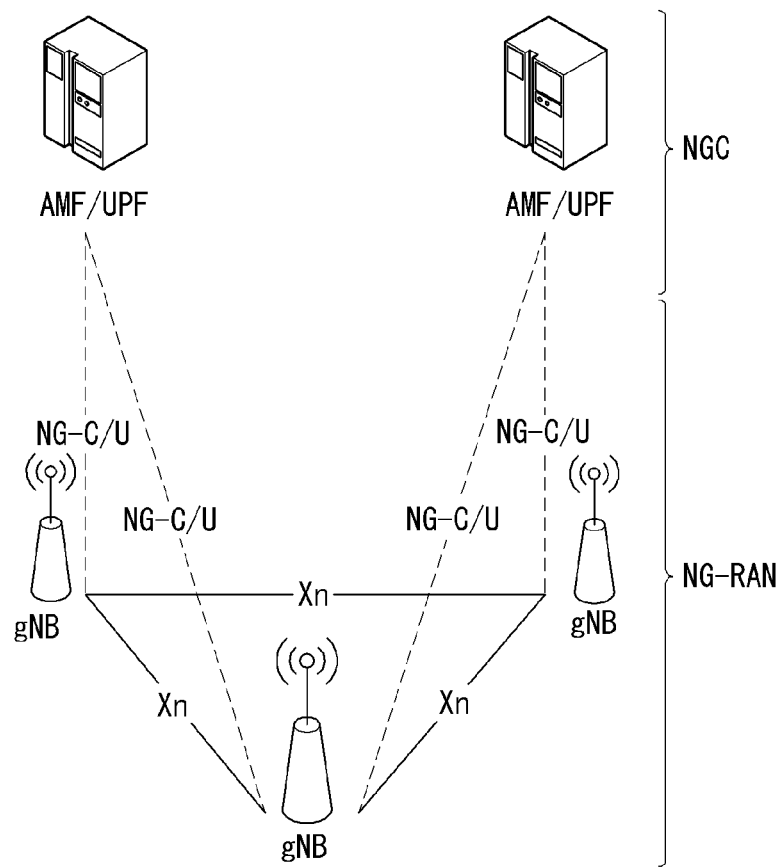

[FIG. 2]
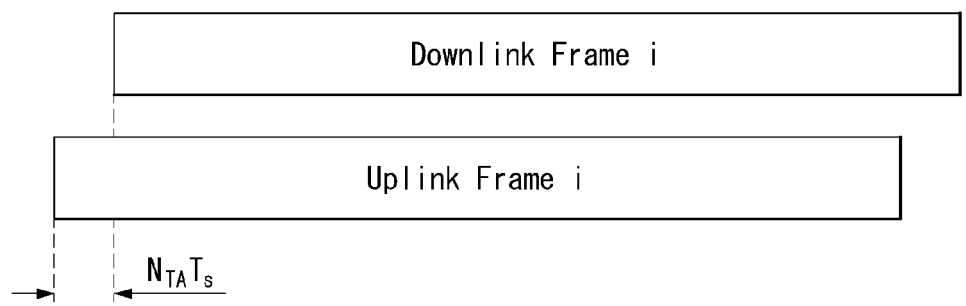

[FIG. 3]
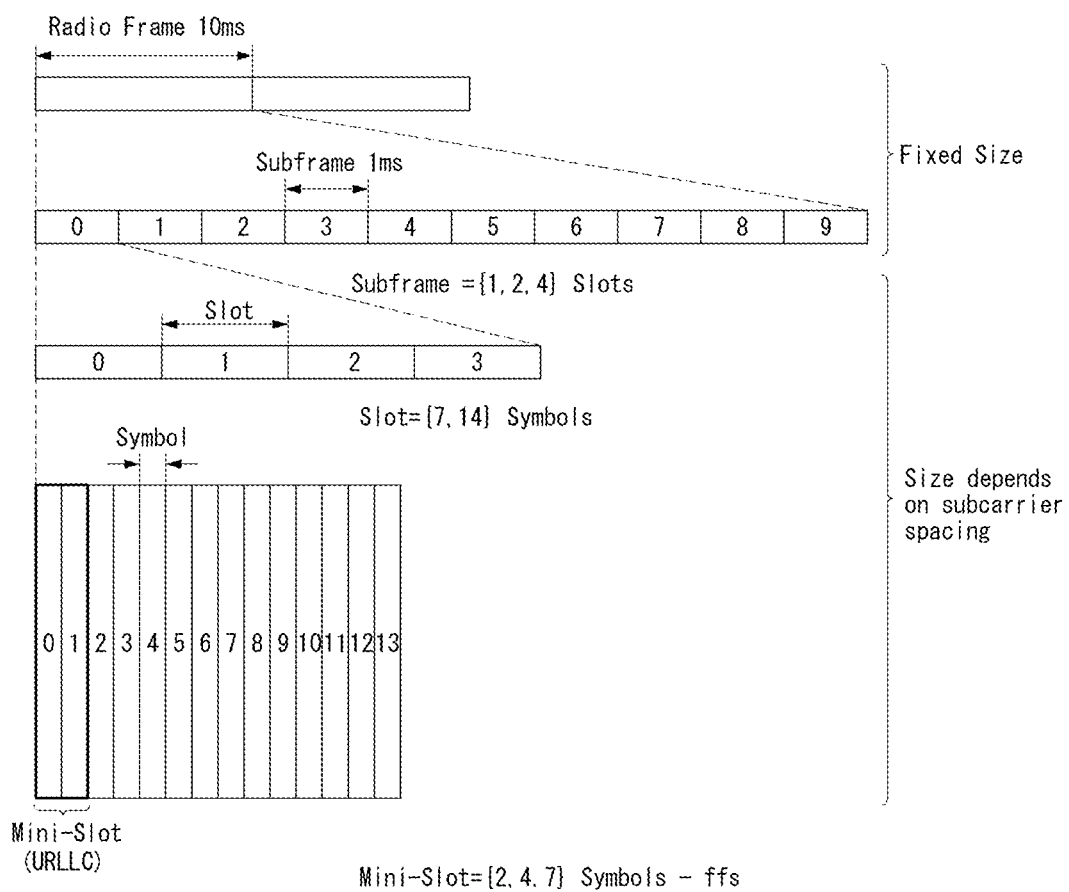

[FIG. 4]
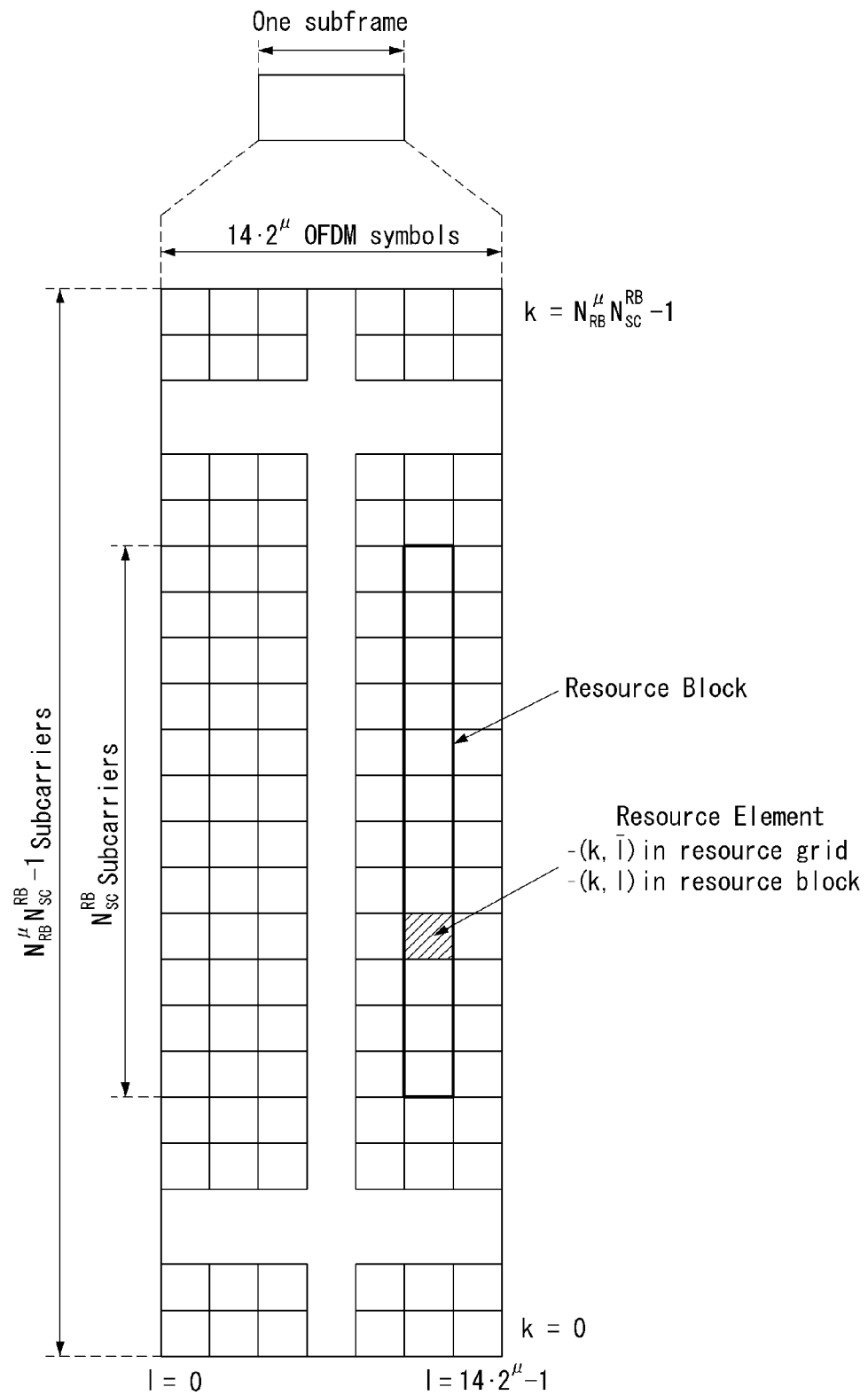

【FIG. 5】
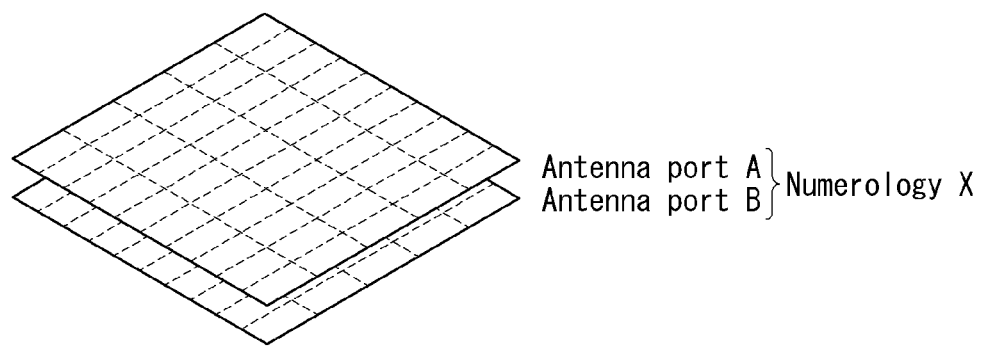
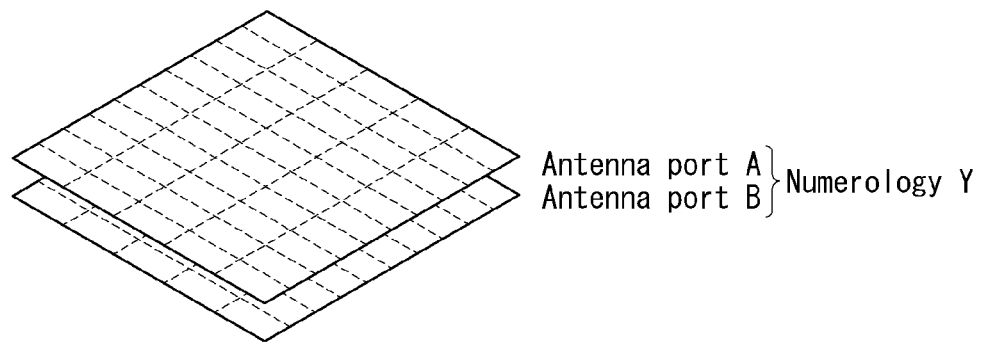

[FIG. 6]
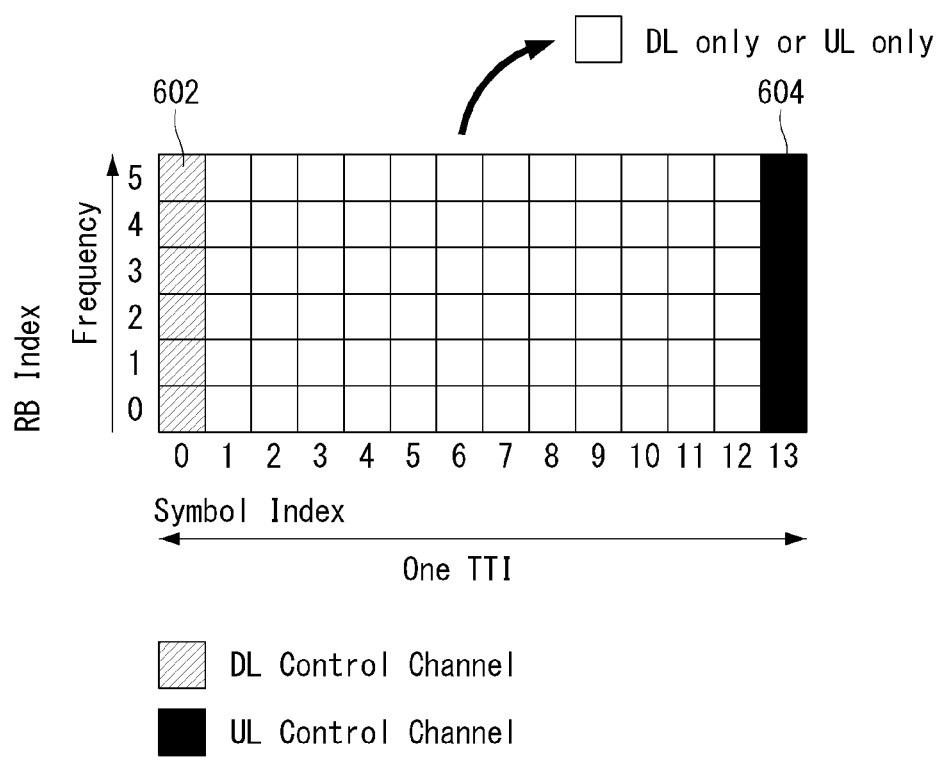

[FIG. 7]
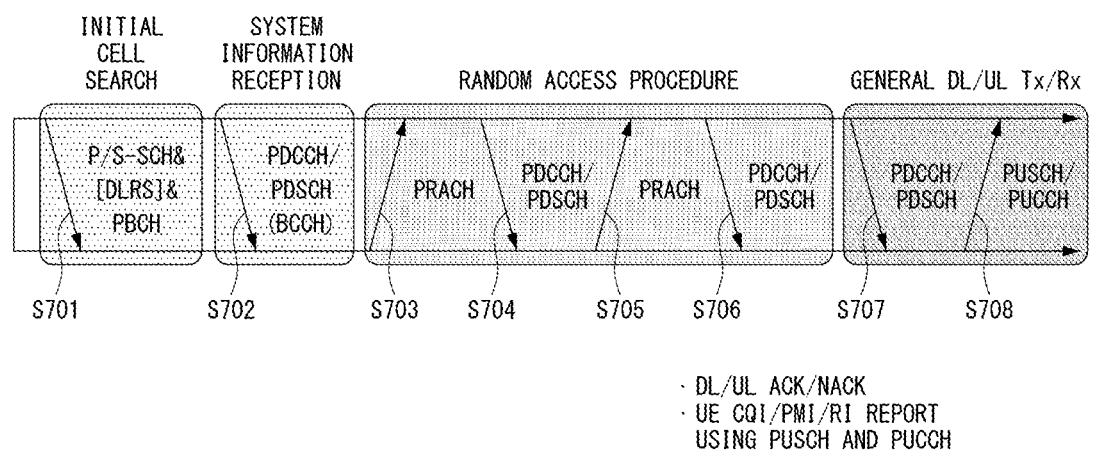

[FIG. 8]
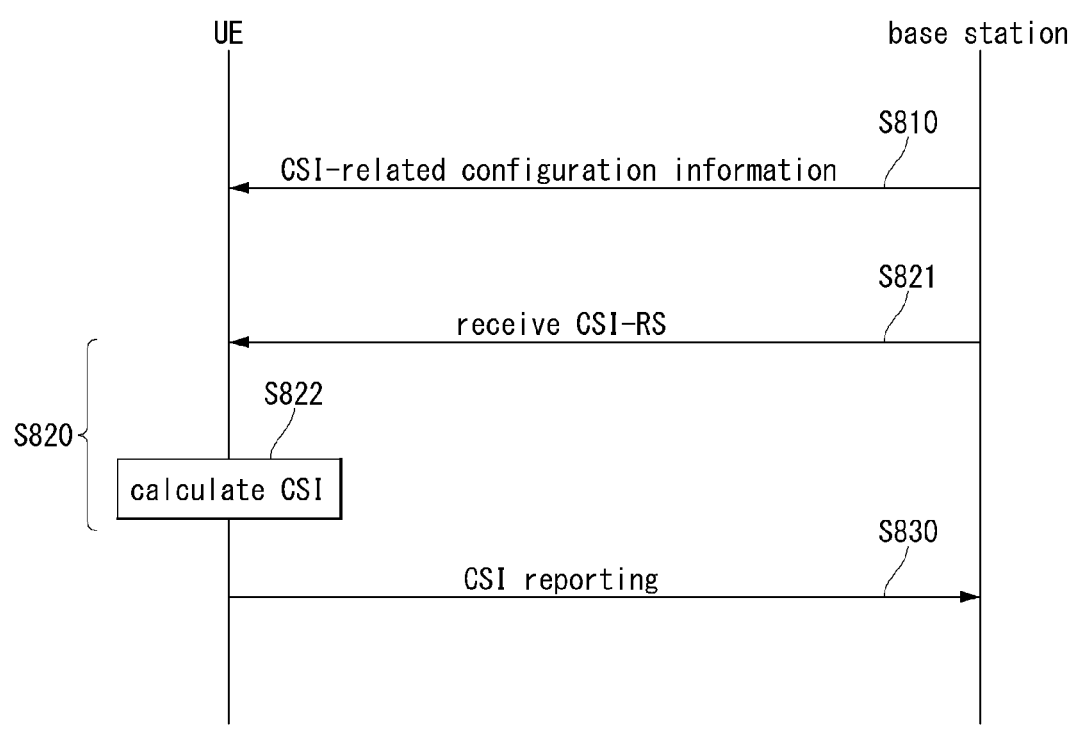

[FIG. 9]
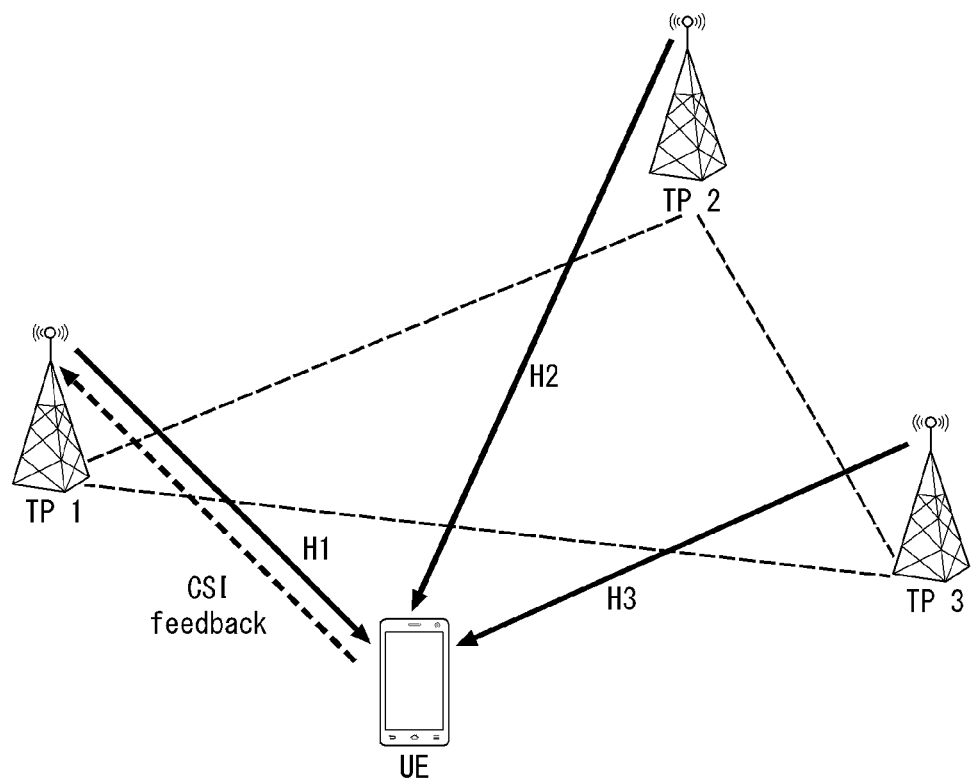

[FIG. 10]
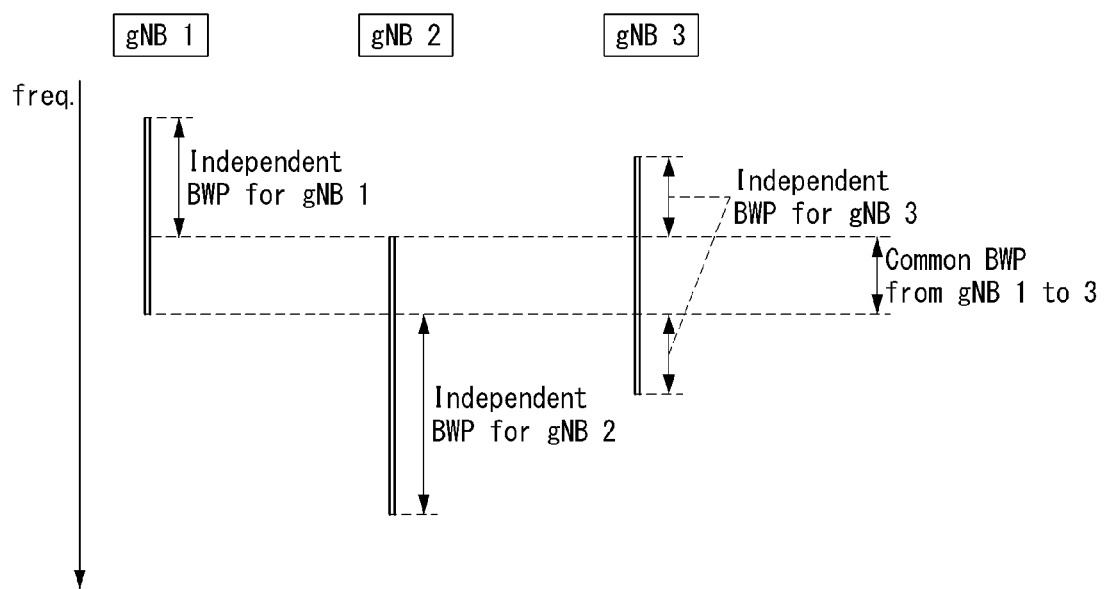

[FIG. 11]
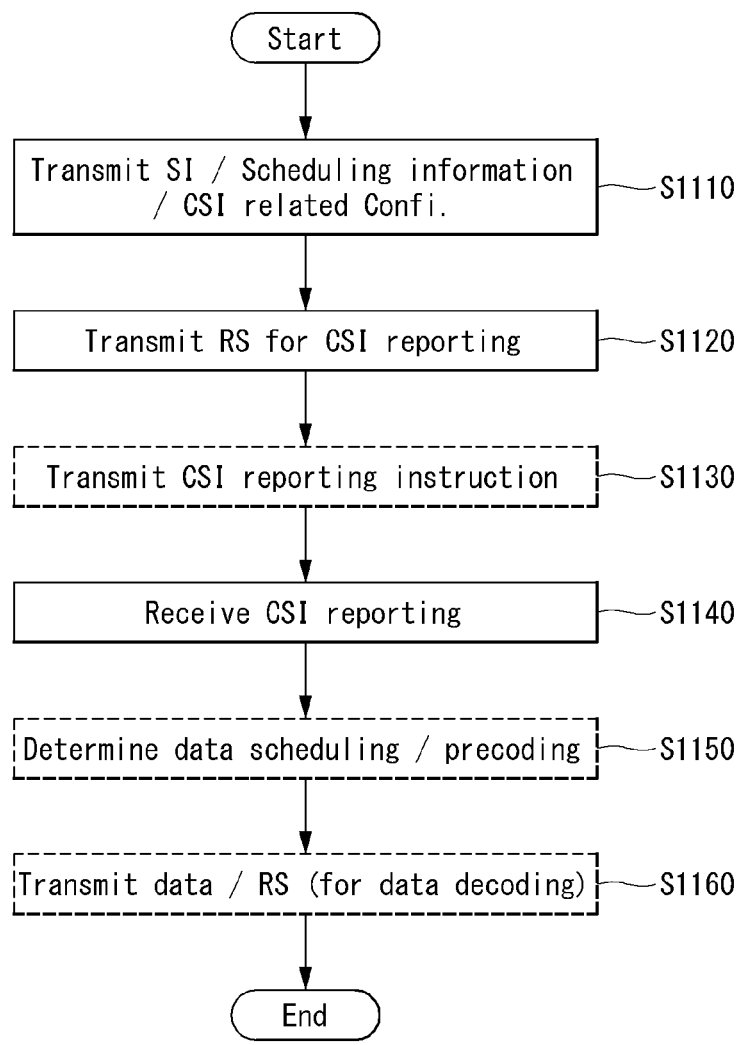

[FIG. 12]
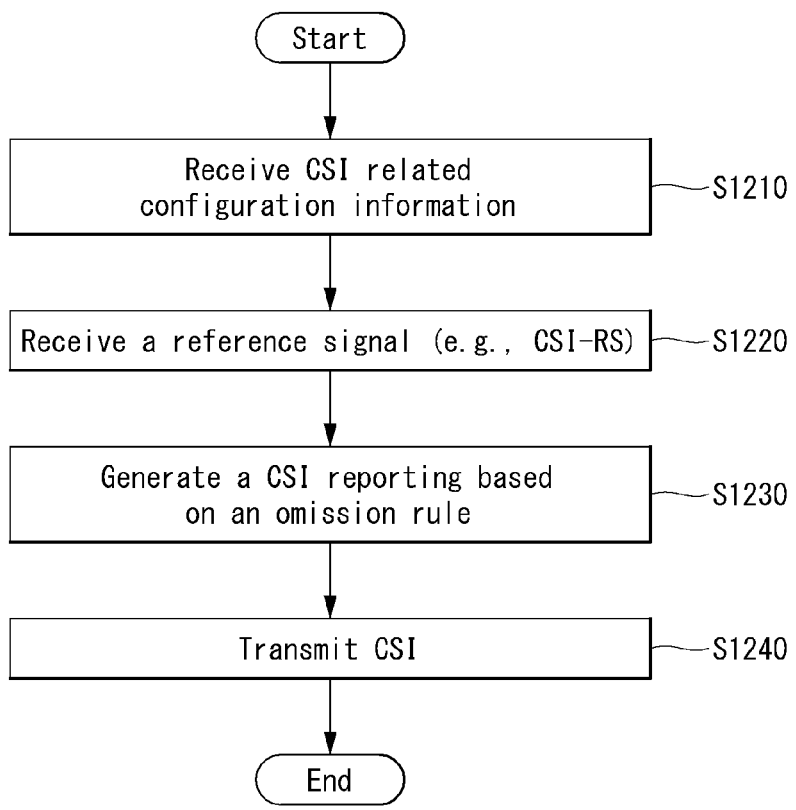

[FIG. 13]
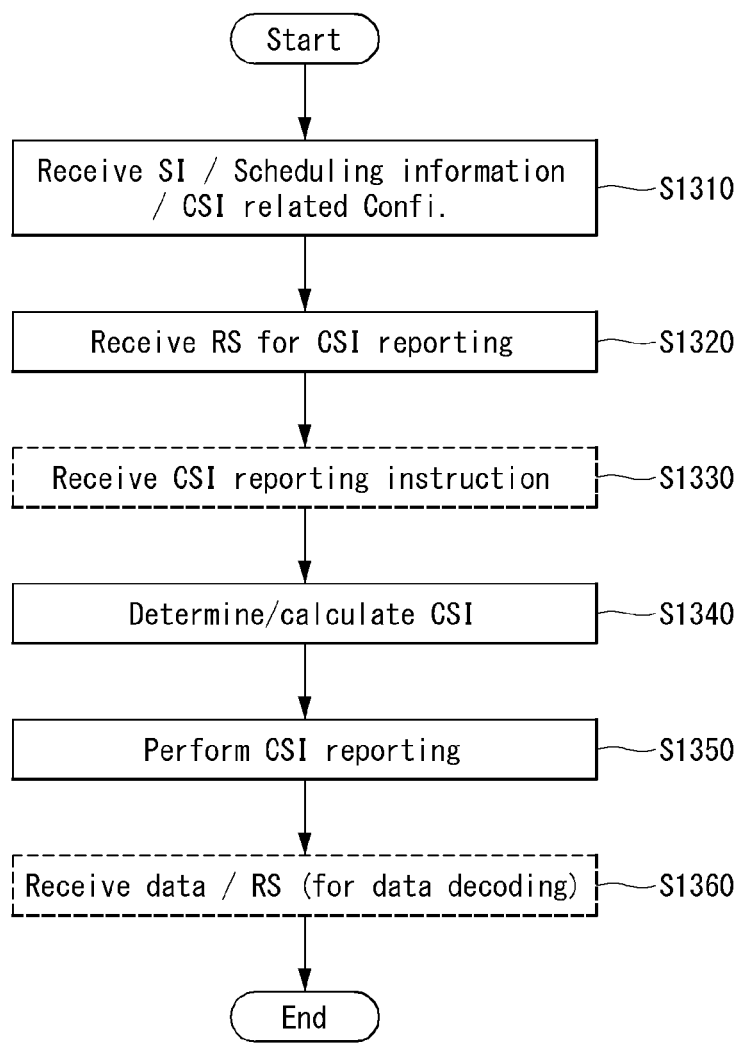

[FIG. 14]
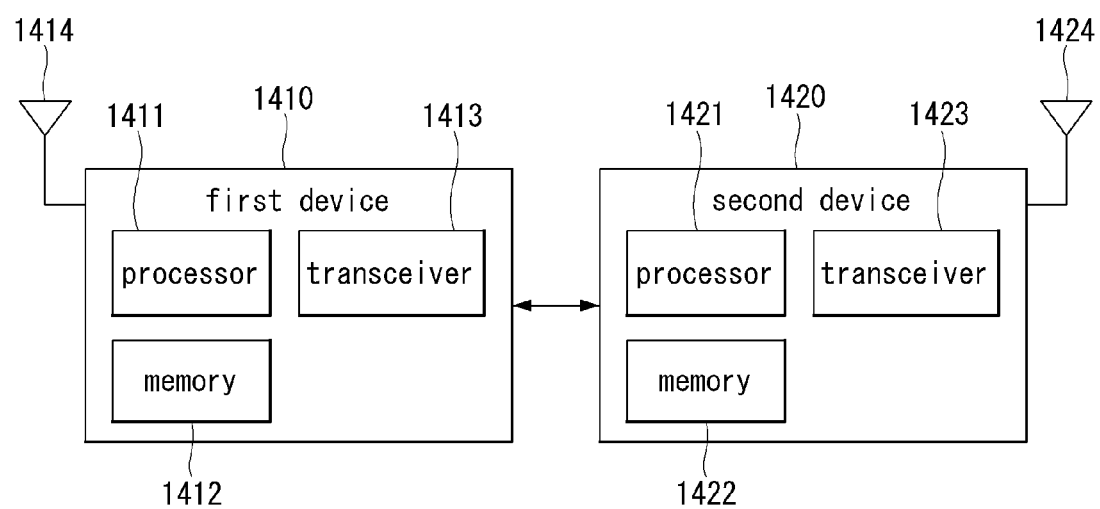

[FIG. 15]
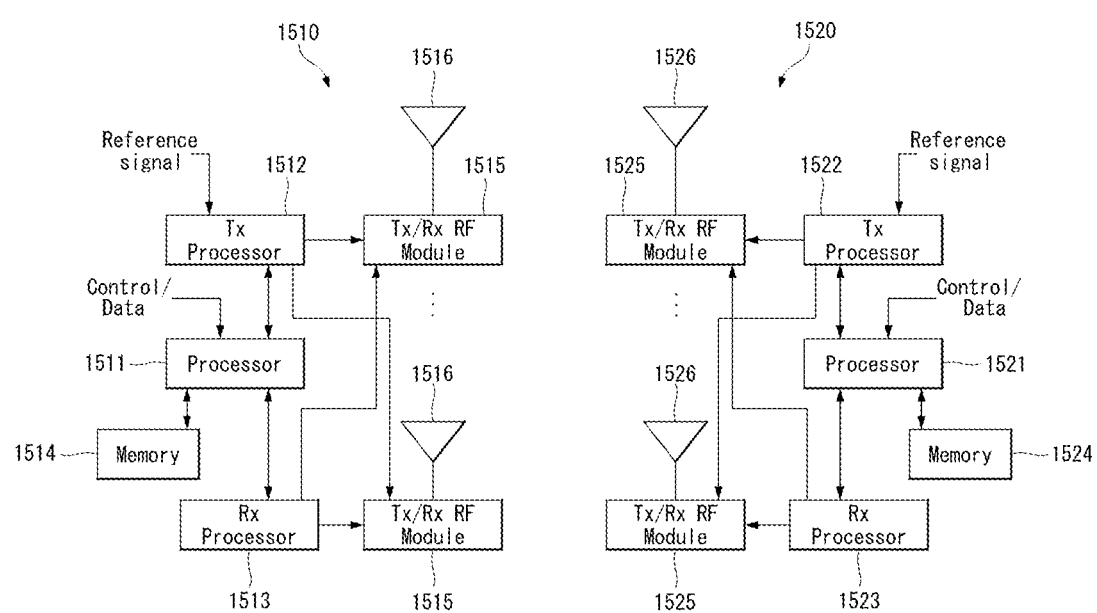

[FIG. 16]
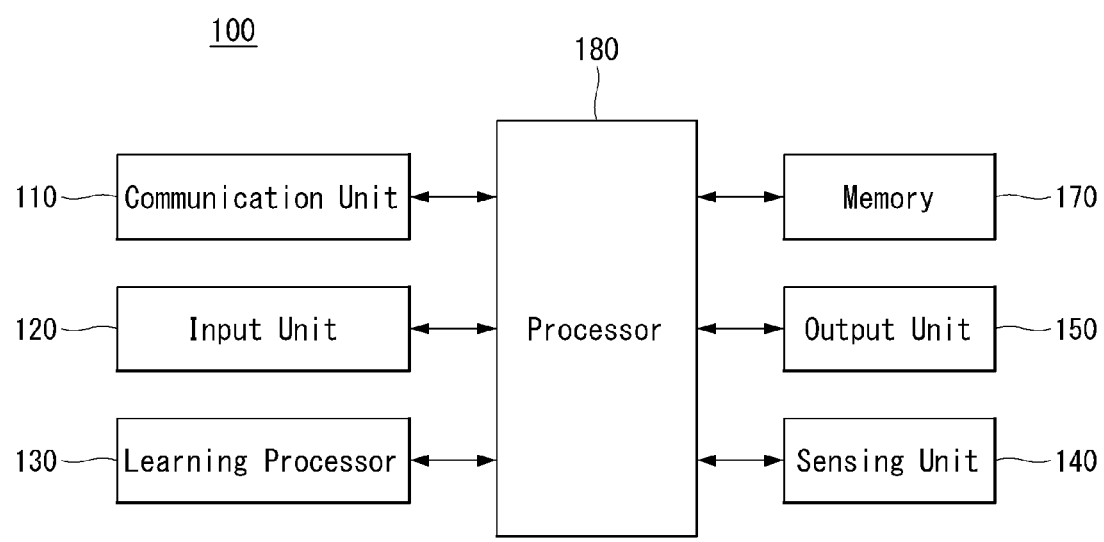

[FIG. 17]
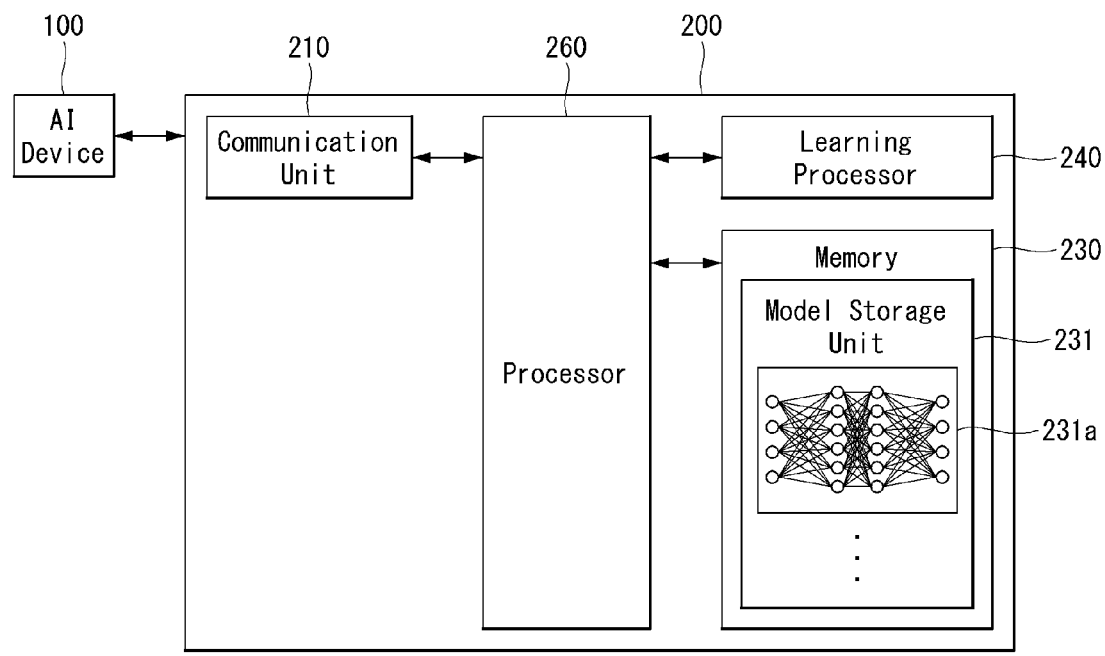

[FIG. 18]
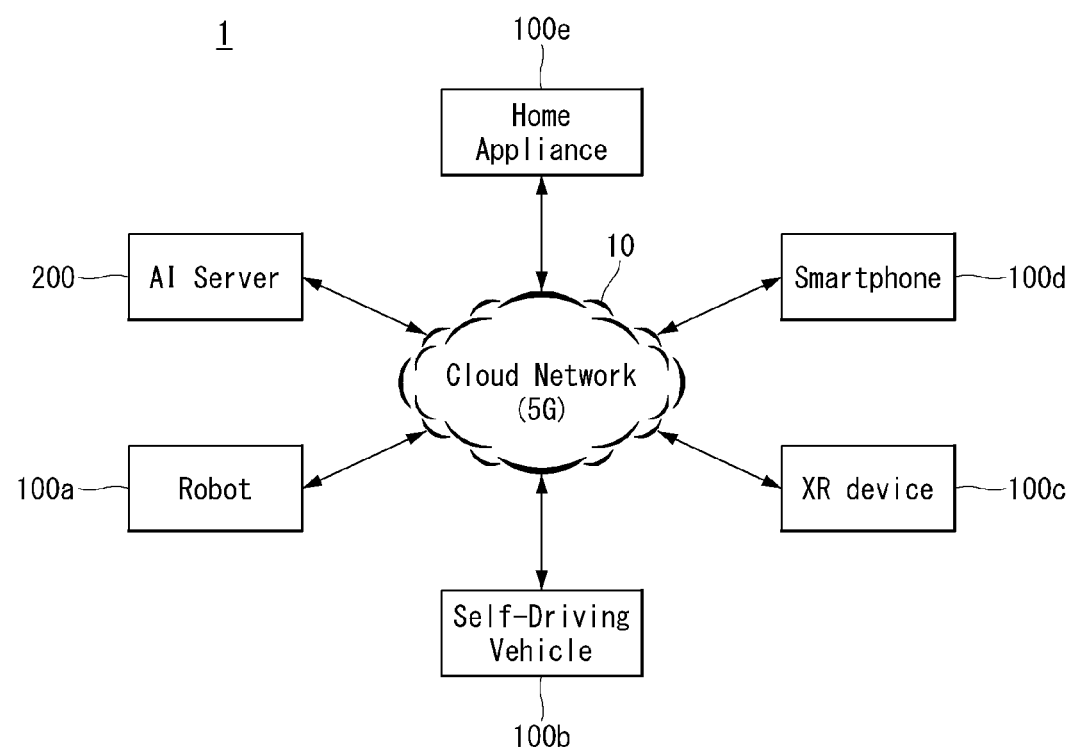

METHOD FOR TRANSMITTING/RECEIVING CHANNEL STATE INFORMATION IN WIRELESS COMMUNICATION SYSTEM, AND DEVICE THEREFOR

CROSS-REFERENCE TO RELATED APPLICATIONS

This application is the National Stage filing under 35 U.S.C. 371 of International Application No. PCT/KR2019/009303, filed on Jul. 26, 2019, which claims the benefit of KR Application No. 10-2018-0088522, filed on Jul. 30, 2018, No. 10-2019-0075390, filed on Jun. 25, 2019, the contents of which are all hereby incorporated by reference herein in their entirety.

TECHNICAL FIELD

The present disclosure relates to a wireless communication system and, more particularly, to a method for transmitting and receiving channel state information based on omission rules and a device supporting the same.

BACKGROUND ART

A mobile communication system has been developed to provide a voice service while ensuring the activity of a user. However, the area of the mobile communication system has extended to a data service in addition to a voice. Due to the current explosive increase in traffic, there is a shortage of resources, and thus users demand a higher speed service. Accordingly, there is a need for a more advanced mobile communication system.

Requirements for a next-generation mobile communication system need to able to support the accommodation of explosive data traffic, a dramatic increase in the data rate per user, the accommodation of a significant increase in the number of connected devices, very low end-to-end latency, and high-energy efficiency. To this end, various technologies, such as dual connectivity, massive multiple input multiple output (MIMO), in-band full duplex, non-orthogonal multiple access (NOMA), super wideband support, and device networking, are researched.

DISCLOSURE

Technical Problem

In a method for transmitting and receiving channel state information in a wireless communication system, an object of the present disclosure is to propose a method for generating channel state information based on CSI omission rules.

Particularly, in transmitting channel state information for a plurality of base stations that performs CoMP operation, an object of the present disclosure is to propose a method for configuring (defining) a CSI omission rule based on priories of parameters configuring channel state information, and based on it, omitting a part of or the whole channel state information and transmitting it.

In addition, an object of the present disclosure is to propose a method for configuring (defining) a CSI omission rule for parameters configuring channel state information based on a priority of a plurality of base stations.

Objects of the disclosure are not limited to the foregoing technical objects, and other unmentioned objects would be apparent to one of ordinary skill in the art from the following description.

Technical Solution

In an aspect, a method for reporting channel state information (CSI) performed by a user equipment (UE) supported by multiple base stations in a wireless communication system according to an embodiment of the present disclosure may include receiving CSI related configuration information for the multiple base stations; receiving a reference signal from the multiple base stations; generating CSI based on a CSI omission rule; and transmitting the CSI to at least one base station among the multiple base stations, wherein the CSI may include information for multiple channels configured between the multiple base stations and the UE, and wherein the CSI omission rule may be determined based on at least one of i) a type of the CSI, ii) a part of the CSI, iii) priority information among CSI parameters and/or iv) priority information among the multiple base stations.

Furthermore, in the method according to an embodiment of the present disclosure, the CSI may be transmitted on a single uplink resource.

Furthermore, in the method according to an embodiment of the present disclosure, in the CSI omission rule, a priority of a wideband CSI parameter for the entire multiple base stations may be higher than a priority of a subband CSI parameter of a single base station among the multiple base stations.

Furthermore, in the method according to an embodiment of the present disclosure, a subband CSI parameter for each base station of the multiple base stations may be divided into two or more groups depending on a specific rule in a comb form, and wherein, in the CSI omission rule, a priority of a subband CSI parameter of a group for the entire multiple base stations may be higher than a priority of a subband CSI parameter of another group.

Furthermore, in the method according to an embodiment of the present disclosure, a priority of the CSI omission rule for part 1 of the CSI may be determined in an order of RI, CRI and CQI.

Furthermore, in the method according to an embodiment of the present disclosure, in the CSI omission rule, a priority of a subband CSI parameter of a specific base station among the multiple base stations may be higher than a priority of a wideband CSI parameter of another base station.

Furthermore, in the method according to an embodiment of the present disclosure, the CSI related configuration information may include information related to a priority of the multiple base stations.

Furthermore, in the method according to an embodiment of the present disclosure, the information related to a priority of the multiple base stations may include an instruction for the UE to set a priority of the multiple base stations according to a wideband CQI.

Furthermore, in the method according to an embodiment of the present disclosure, the information related to a priority of the multiple base stations may include information representing that a priority of the multiple base stations is set with corresponding to indices of the multiple base stations to the UE.

Furthermore, in the method according to an embodiment of the present disclosure, the CSI related configuration information may include a CSI report setting, when the CSI report setting is different for each of the multiple base stations, in the CSI omission rule, a CSI parameter of a common BWP to the multiple base stations may be higher than a CSI parameter of an independent BWP.

Furthermore, in the method according to an embodiment of the present disclosure, the CSI omission rule may be applied to each of the common BWP and the independent BWP.

Furthermore, in the method according to an embodiment of the present disclosure, the CSI related configuration information may further include information representing a CSI omission rule to be applied by the UE to generate the CSI among a plurality of CSI omission rules.

In another aspect, a user equipment (UE) supported by multiple base stations for reporting channel state information (CSI) in a wireless communication system according to an embodiment of the present disclosure may include a transceiver for transmitting and receiving a wireless signal; and a processor functionally connected to the transceiver, wherein the processor controls the transceiver configured to: receive CSI related configuration information for the multiple base stations and a reference signal from the multiple base stations, generate CSI based on a CSI omission rule; and transmit the CSI to at least one base station among the multiple base stations, wherein the CSI may include information for multiple channels configured between the multiple base stations and the UE, and wherein the CSI omission rule may be determined based on at least one of i) a type of the CSI, ii) a part of the CSI, iii) priority information among CSI parameters and/or iv) priority information among the multiple base stations.

Furthermore, in the UE according to an embodiment of the present disclosure, the CSI may be transmitted on a single uplink resource.

Furthermore, in the UE according to an embodiment of the present disclosure, in the CSI omission rule, a priority of a subband CSI parameter of a specific base station among the multiple base stations may be higher than a priority of a wideband CSI parameter of another base station.

Advantageous Effects

According to an embodiment of the present disclosure, a CSI omission rule for parameters that configure channel state information may be configured (defined) according to a type and a part of the channel state information.

Furthermore, according to an embodiment of the present disclosure, a CSI omission rule for parameters that configure channel state information may be configured (defined) by considering multiple base stations that perform a CoMP operation.

Furthermore, according to an embodiment of the present disclosure, CSI is generated based on an omission rule, and there is an effect that the CSI may be transmitted in accordance with a configured reporting container size or resource.

Furthermore, according to an embodiment of the present disclosure, CSI generated based on an omission rule is transmitted to at least one base station among multiple base stations that perform a CoMP operation, and a resource of time and/or frequency domain may be efficiently used.

Effects obtainable from the present invention are not limited by the effects mentioned above, and other effects which are not mentioned above can be clearly understood from the following description by those skilled in the art to which the present invention pertains.

DESCRIPTION OF DRAWINGS

The accompanying drawings, which are included to provide a further understanding of the disclosure and constitute a part of the detailed description, illustrate embodiments of the disclosure and together with the description serve to explain the principle of the disclosure.

FIG. 1 illustrates an example of an overall structure of an NR system to which a method proposed in the disclosure may be applied.

FIG. 2 illustrates the relation between an uplink frame and a downlink frame in a wireless communication system to which a method proposed in the disclosure may be applied.

FIG. 3 illustrates an example of a frame structure in an NR system.

FIG. 4 illustrates an example of a resource grid supported by a wireless communication system to which a method proposed in the disclosure may be applied.

FIG. 5 illustrates examples of a resource grid for each antenna port and numerology to which a method proposed in the disclosure may be applied.

FIG. 6 illustrates an example self-contained structure to which a method proposed herein is applicable.

FIG. 7 illustrates an example signal transmission/reception method.

FIG. 8 is a flowchart illustrating an example CSI-related procedure.

FIG. 9 illustrates an example of a CoMP operation for which three transmission points (TPs) (or base stations) may share information for supporting a UE through backhaul.

FIG. 10 illustrates an example in which different RRC settings are configured for three TPs.

FIG. 11 illustrates an example of an operation flowchart of a base station that receives CSI to which a method proposed in the present disclosure may be applied.

FIG. 12 illustrates an example of an operation flowchart of a UE that transmits CSI to which a method proposed in the present disclosure may be applied.

FIG. 13 illustrates another example of an operation flowchart of a UE that receives CSI to which a method proposed in the present disclosure may be applied.

FIG. 14 is an example of a block diagram illustrating a wireless communication device to which the methods proposed in the present specification may be applied according to embodiment of the disclosure.

FIG. 15 is an another example of a block diagram illustrating a wireless communication device to which the methods proposed in the present specification may be applied according to embodiment of the disclosure.

FIG. 16 illustrates an AI device 100 according to an embodiment of the disclosure.

FIG. 17 illustrates an AI server 200 according to an embodiment of the disclosure.

FIG. 18 illustrates an AI system 1 according to an embodiment of the disclosure.

MODE FOR DISCLOSURE

Reference will now be made in detail to embodiments of the disclosure, examples of which are illustrated in the accompanying drawings. A detailed description to be disclosed below together with the accompanying drawing is to describe exemplary embodiments of the disclosure and not to describe a unique embodiment for carrying out the disclosure. The detailed description below includes details to provide a complete understanding of the disclosure. However, those skilled in the art know that the disclosure may be carried out without the details.

In some cases, in order to prevent a concept of the disclosure from being ambiguous, known structures and devices may be omitted or illustrated in a block diagram format based on core functions of each structure and device.

Hereinafter, downlink (DL) means communication from the base station to the terminal and uplink (UL) means communication from the terminal to the base station. In downlink, a transmitter may be part of the base station, and a receiver may be part of the terminal. In downlink, the transmitter may be part of the terminal and the receiver may be part of the terminal. The base station may be expressed as a first communication device and the terminal may be expressed as a second communication device. A base station (BS) may be replaced with terms including a fixed station, a Node B, an evolved-NodeB (eNB), a Next Generation NodeB (gNB), a base transceiver system (BTS), an access point (AP), a network (5G network), an AI system, a road side unit (RSU), a vehicle, a robot, an Unmanned Aerial Vehicle (UAV), an Augmented Reality (AR) device, a Virtual Reality (VR) device, and the like. Further, the terminal may be fixed or mobile and may be replaced with terms including a User Equipment (UE), a Mobile Station (MS), a user terminal (UT), a Mobile Subscriber Station (MSS), a Subscriber Station (SS), an Advanced Mobile Station (AMS), a Wireless Terminal (WT), a Machine-Type Communication (MTC) device, a Machine-to-Machine (M2M) device, and a Device-to-Device (D2D) device, the vehicle, the robot, an AI module, the Unmanned Aerial Vehicle (UAV), the Augmented Reality (AR) device, the Virtual Reality (VR) device, and the like.

The following technology may be used in various radio access system including CDMA, FDMA, TDMA, OFDMA, SC-FDMA, and the like. The CDMA may be implemented as radio technology such as Universal Terrestrial Radio Access (UTRA) or CDMA2000. The TDMA may be implemented as radio technology such as a global system for mobile communications (GSM)/general packet radio service (GPRS)/enhanced data rates for GSM evolution (EDGE). The OFDMA may be implemented as radio technology such as Institute of Electrical and Electronics Engineers (IEEE) 802.11 (Wi-Fi), IEEE 802.16 (WiMAX), IEEE 802.20, Evolved UTRA (E-UTRA), or the like. The UTRA is a part of Universal Mobile Telecommunications System (UMTS). 3rd Generation Partnership Project (3GPP) Long Term Evolution (LTE) is a part of Evolved UMTS (E-UMTS) using the E-UTRA and LTE-Advanced (A)/LTE-A pro is an evolved version of the 3GPP LTE. 3GPP NR (New Radio or New Radio Access Technology) is an evolved version of the 3GPP LTE/LTE-A/LTE-A pro.

For clarity of description, the technical spirit of the disclosure is described based on the 3GPP communication system (e.g., LTE-A or NR), but the technical spirit of the disclosure are not limited thereto. LTE means technology after 3GPP TS 36.xxx Release 8. In detail, LTE technology after 3GPP TS 36.xxx Release 10 is referred to as the LTE-A and LTE technology after 3GPP TS 36.xxx Release 13 is referred to as the LTE-A pro. The 3GPP NR means technology after TS 38.xxx Release 15. The LTE/NR may be referred to as a 3GPP system. "xxx" means a standard document detail number. Matters disclosed in a standard document opened before the disclosure may be referred to for a background art, terms, abbreviations, etc., used for describing the disclosure. For example, the following documents may be referred to.

3GPP LTE
  36.211: Physical channels and modulation
  36.212: Multiplexing and channel coding
  36.213: Physical layer procedures
  36.300: Overall description
  36.331: Radio Resource Control (RRC)
3GPP NR
  38.211: Physical channels and modulation
  38.212: Multiplexing and channel coding
  38.213: Physical layer procedures for control
  38.214: Physical layer procedures for data
  38.300: NR and NG-RAN Overall Description
  36.331: Radio Resource Control (RRC) protocol specification As more and more communication devices require larger communication capacity, there is a need for improved mobile broadband communication compared to the existing radio access technology (RAT). Further, massive machine type communications (MTCs), which provide various services anytime and anywhere by connecting many devices and objects, are one of the major issues to be considered in the next generation communication. In addition, a communication system design considering a service/UE sensitive to reliability and latency is being discussed. The introduction of next generation radio access technology considering enhanced mobile broadband communication (eMBB), massive MTC (mMTC), ultra-reliable and low latency communication (URLLC) is discussed, and in the disclosure, the technology is called new RAT for convenience. The NR is an expression representing an example of 5G radio access technology (RAT).

Three major requirement areas of 5G include (1) an enhanced mobile broadband (eMBB) area, (2) a massive machine type communication (mMTC) area and (3) an ultra-reliable and low latency communications (URLLC) area.

Some use cases may require multiple areas for optimization, and other use case may be focused on only one key performance indicator (KPI). 5G support such various use cases in a flexible and reliable manner.

eMBB is far above basic mobile Internet access and covers media and entertainment applications in abundant bidirectional tasks, cloud or augmented reality. Data is one of key motive powers of 5G, and dedicated voice services may not be first seen in the 5G era. In 5G, it is expected that voice will be processed as an application program using a data connection simply provided by a communication system. Major causes for an increased traffic volume include an increase in the content size and an increase in the number of applications that require a high data transfer rate. Streaming service (audio and video), dialogue type video and mobile Internet connections will be used more widely as more devices are connected to the Internet. Such many application programs require connectivity always turned on in order to push real-time information and notification to a user. A cloud storage and application suddenly increases in the mobile communication platform, and this may be applied to both business and entertainment. Furthermore, cloud storage is a special use case that tows the growth of an uplink data transfer rate. 5G is also used for remote business of cloud. When a tactile interface is used, further lower end-to-end latency is required to maintain excellent user experiences. Entertainment, for example, cloud game and video streaming are other key elements which increase a need for the mobile broadband ability. Entertainment is essential in the smartphone and tablet anywhere including high mobility environments, such as a train, a vehicle and an airplane. Another use case is augmented reality and information search for entertainment. In this case, augmented reality requires very low latency and an instant amount of data.

Furthermore, one of the most expected 5G use case relates to a function capable of smoothly connecting embedded sensors in all fields, that is, mMTC. Until 2020, it is expected that potential IoT devices will reach 20.4 billions. The industry IoT is one of areas in which 5G performs major roles enabling smart city, asset tracking, smart utility, agriculture and security infra.

URLLC includes a new service which will change the industry through remote control of major infra and a link having ultra reliability/low available latency, such as a self-driving vehicle. A level of reliability and latency is essential for smart grid control, industry automation, robot engineering, drone control and adjustment.

Multiple use cases are described more specifically.

5G may supplement fiber-to-the-home (FTTH) and cable-based broadband (or DOCSIS) as means for providing a stream evaluated from gigabits per second to several hundreds of mega bits per second. Such fast speed is necessary to deliver TV with resolution of 4K or more (6K, 8K or more) in addition to virtual reality and augmented reality. Virtual reality (VR) and augmented reality (AR) applications include immersive sports games. A specific application program may require a special network configuration. For example, in the case of VR game, in order for game companies to minimize latency, a core server may need to be integrated with the edge network server of a network operator.

An automotive is expected to be an important and new motive power in 5G, along with many use cases for the mobile communication of an automotive. For example, entertainment for a passenger requires a high capacity and a high mobility mobile broadband at the same time. The reason for this is that future users continue to expect a high-quality connection regardless of their location and speed. Another use example of the automotive field is an augmented reality dashboard. The augmented reality dashboard overlaps and displays information, identifying an object in the dark and notifying a driver of the distance and movement of the object, over a thing seen by the driver through a front window. In the future, a wireless module enables communication between automotives, information exchange between an automotive and a supported infrastructure, and information exchange between an automotive and other connected devices (e.g., devices accompanied by a pedestrian). A safety system guides alternative courses of a behavior so that a driver can drive more safely, thereby reducing a danger of an accident. A next step will be a remotely controlled or self-driven vehicle. This requires very reliable, very fast communication between different self-driven vehicles and between an automotive and infra. In the future, a self-driven vehicle may perform all driving activities, and a driver will be focused on things other than traffic, which cannot be identified by an automotive itself. Technical requirements of a self-driven vehicle require ultra-low latency and ultra-high speed reliability so that traffic safety is increased up to a level which cannot be achieved by a person.

A smart city and smart home mentioned as a smart society will be embedded as a high-density radio sensor network. The distributed network of intelligent sensors will identify the cost of a city or home and a condition for energy-efficient maintenance. A similar configuration may be performed for each home. All of a temperature sensor, a window and heating controller, a burglar alarm and home appliances are wirelessly connected. Many of such sensors are typically a low data transfer rate, low energy and a low cost. However, for example, real-time HD video may be required for a specific type of device for surveillance.

The consumption and distribution of energy including heat or gas are highly distributed and thus require automated control of a distributed sensor network. A smart grid collects information, and interconnects such sensors using digital information and a communication technology so that the sensors operate based on the information. The information may include the behaviors of a supplier and consumer, and thus the smart grid may improve the distribution of fuel, such as electricity, in an efficient, reliable, economical, production-sustainable and automated manner. The smart grid may be considered to be another sensor network having small latency.

A health part owns many application programs which reap the benefits of mobile communication. A communication system can support remote treatment providing clinical treatment at a distant place. This helps to reduce a barrier for the distance and can improve access to medical services which are not continuously used at remote farming areas. Furthermore, this is used to save life in important treatment and an emergency condition. A radio sensor network based on mobile communication can provide remote monitoring and sensors for parameters, such as the heart rate and blood pressure.

Radio and mobile communication becomes increasingly important in the industry application field. Wiring requires a high installation and maintenance cost. Accordingly, the possibility that a cable will be replaced with reconfigurable radio links is an attractive opportunity in many industrial fields. However, to achieve the possibility requires that a radio connection operates with latency, reliability and capacity similar to those of the cable and that management is simplified. Low latency and a low error probability is a new requirement for a connection to 5G.

Logistics and freight tracking is an important use case for mobile communication, which enables the tracking inventory and packages anywhere using a location-based information system. The logistics and freight tracking use case typically requires a low data speed, but a wide area and reliable location information.

In a new RAT system including NR uses an OFDM transmission scheme or a similar transmission scheme thereto. The new RAT system may follow OFDM parameters different from OFDM parameters of LTE. Alternatively, the new RAT system may follow numerology of conventional LTE/LTE-A as it is or have a larger system bandwidth (e.g., 100 MHz). Alternatively, one cell may support a plurality of numerologies. In other words, UEs that operate with different numerologies may coexist in one cell.

The numerology corresponds to one subcarrier spacing in a frequency domain. Different numerologies may be defined by scaling reference subcarrier spacing to an integer N.

Definition of Terms eLTE eNB: The eLTE eNB is the evolution of eNB that supports connectivity to EPC and NGC.

gNB: A node which supports the NR as well as connectivity to NGC.

New RAN: A radio access network which supports either NR or E-UTRA or interfaces with the NGC.

Network slice: A network slice is a network created by the operator customized to provide an optimized solution for a specific market scenario which demands specific requirements with end-to-end scope.

Network function: A network function is a logical node within a network infrastructure that has well-defined external interfaces and well-defined functional behavior.

NG-C: A control plane interface used on NG2 reference points between new RAN and NGC.

NG-U: A user plane interface used on NG3 references points between new RAN and NGC.

Non-standalone NR: A deployment configuration where the gNB requires an LTE eNB as an anchor for control plane connectivity to EPC, or requires an eLTE eNB as an anchor for control plane connectivity to NGC.

Non-standalone E-UTRA: A deployment configuration where the eLTE eNB requires a gNB as an anchor for control plane connectivity to NGC.

User plane gateway: A termination point of NG-U interface.

Overview of System

FIG. 1 illustrates an example of an overall structure of an NR system to which a method proposed in the disclosure may be applied.

Referring to FIG. 1, an NG-RAN is configured with an NG-RA user plane (new AS sublayer/PDCP/RLC/MAC/PHY) and gNBs which provide a control plane (RRC) protocol end for a user equipment (UE).

The gNBs are interconnected through an Xn interface.

The gNBs are also connected to an NGC through an NG interface.

More specifically the gNBs are connected to an access and mobility management function (AMF) through an N2 interface and to a user plane function (UPF) through an N3 interface.

NR (New Rat) Numerology and Frame Structure

In the NR system, multiple numerologies may be supported. The numerologies may be defied by subcarrier spacing and a CP (Cyclic Prefix) overhead. Spacing between the plurality of subcarriers may be derived by scaling basic subcarrier spacing into an integer N (or μ). In addition, although a very low subcarrier spacing is assumed not to be used at a very high subcarrier frequency, a numerology to be used may be selected independent of a frequency band.

In addition, in the NR system, a variety of frame structures according to the multiple numerologies may be supported.

Hereinafter, an orthogonal frequency division multiplexing (OFDM) numerology and a frame structure, which may be considered in the NR system, will be described.

A plurality of OFDM numerologies supported in the NR system may be defined as in Table 1.

TABLE 1

| μ | $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

Regarding a frame structure in the NR system, a size of various fields in the time domain is expressed as a multiple of a time unit of $T_s=1/(\Delta f_{max} \cdot N_f)$. In this case, $\Delta f_{max}=480 \cdot 10^3$, and $N_f=4096$. DL and UL transmission is configured as a radio frame having a section of $T_f=(\Delta f_{max} N_f/100) \cdot T_s=10$ ms. The radio frame is composed of ten subframes each having a section of $T_{sf}=(\Delta f_{max} N_f/1000) \cdot T_s=1$ ms. In this case, there may be a set of UL frames and a set of DL frames.

FIG. 2 illustrates the relation between an uplink frame and a downlink frame in a wireless communication system to which a method proposed in the disclosure may be applied.

As illustrated in FIG. 2, uplink frame number i for transmission from a user equipment (UE) shall start $T_{TA}=N_{TA}T_s$, before the start of a corresponding downlink frame at the corresponding UE.

Regarding the numerology μ, slots are numbered in increasing order of $n_s^\mu \in \{0, \ldots, N_{subframe}^{slots, \mu}-1\}$ within a subframe and are numbered in increasing order of $n_{s,f}^\mu \in \{0, \ldots, N_{frame}^{slots, \mu}-1\}$ within a radio frame. One slot consists of consecutive OFDM symbols of $N_{symb}^\mu$, and $N_{symb}^\mu$ is determined depending on a numerology used and slot configuration. The start of slots $n_s^\mu$ in a subframe is aligned in time with the start of OFDM symbols $n_s^\mu N_{symb}^\mu$ in the same subframe.

Not all UEs are able to transmit and receive at the same time, and this means that not all OFDM symbols in a downlink slot or an uplink slot are available to be used.

Table 2 represents the number $N_{symb}^{slot}$ of OFDM symbols per slot, the number $N_{slot}^{frame, \mu}$ of slots per radio frame, and the number $N_{slot}^{subframe, \mu}$ of slots per subframe in a normal CP. Table 3 represents the number of OFDM symbols per slot, the number of slots per radio frame, and the number of slots per subframe in an extended CP.

TABLE 2

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 3

| μ | $N_{symb}^{slot}$ | $N_{slot}^{frame,\mu}$ | $N_{slot}^{subframe,\mu}$ |
|---|---|---|---|
| 2 | 12 | 40 | 4 |

FIG. 3 illustrates an example of a frame structure in a NR system. FIG. 3 is merely for convenience of explanation and does not limit the scope of the disclosure.

In Table 3, in case of μ=2, i.e., as an example in which a subcarrier spacing (SCS) is 60 kHz, one subframe (or frame) may include four slots with reference to Table 2, and one subframe={1, 2, 4} slots shown in FIG. 3, for example, the number of slot(s) that may be included in one subframe may be defined as in Table 2.

Further, a mini-slot may consist of 2, 4, or 7 symbols, or may consist of more symbols or less symbols.

In relation to physical resources in the NR system, an antenna port, a resource grid, a resource element, a resource block, a carrier part, etc. May be considered.

Hereinafter, the above physical resources that may be considered in the NR system are described in more detail.

First, in relation to an antenna port, the antenna port is defined so that a channel over which a symbol on an antenna port is conveyed may be inferred from a channel over which another symbol on the same antenna port is conveyed. When large-scale properties of a channel over which a symbol on one antenna port is conveyed may be inferred from a channel over which a symbol on another antenna port is conveyed, the two antenna ports may be regarded as being in a quasi co-located or quasi co-location (QC/QCL) relation. In this case, the large-scale properties may include at least one of delay spread, Doppler spread, frequency shift, average received power, and received timing.

FIG. 4 illustrates an example of a resource grid supported in a wireless communication system to which a method proposed in the disclosure may be applied.

Referring to FIG. 4, a resource grid consists of $N_{RB}^{\mu}N_{sc}^{RB}$ subcarriers on a frequency domain, each subframe consisting of $14 \cdot 2^{\mu}$ OFDM symbols, but the disclosure is not limited thereto.

In the NR system, a transmitted signal is described by one or more resource grids, consisting of $N_{RB}^{\mu}N_{sc}^{RB}$ subcarriers, and $2^{\mu}N_{symb}^{(\mu)}$ OFDM symbols, where $N_{RB}^{\mu} \leq N_{RB}^{max,\mu}$. $N_{RB}^{max,\mu}$ denotes a maximum transmission bandwidth and may change not only between numerologies but also between uplink and downlink.

In this case, as illustrated in FIG. 5, one resource grid may be configured per numerology $\mu$ and antenna port p.

FIG. 5 illustrates examples of a resource grid per antenna port and numerology to which a method proposed in the disclosure is applicable.

Each element of the resource grid for the numerology $\mu$ and the antenna port p is called a resource element and is uniquely identified by an index pair (k,l̄) where k=0, . . . , $N_{RB}^{\mu}N_{sc}^{RB}-1$ is an index on a frequency domain, and l̄=0, . . . , $2^{\mu}N_{symb}^{(\mu)}-1$ refers to a location of a symbol in a subframe. The index pair (k,l) is used to refer to a resource element in a slot, where l=0, . . . , $N_{symb}^{\mu}-1$.

The resource element (k,l̄) for the numerology $\mu$ and the antenna port p corresponds to a complex value $a_{k,l}^{(p,\mu)}$. When there is no risk for confusion or when a specific antenna port or numerology is not specified, the indexes p and $\mu$ may be dropped, and as a result, the complex value may be $a_{k,l}^{(p)}$ or $a_{k,l}$.

Further, a physical resource block is defined as $N_{sc}^{RB}=12$ consecutive subcarriers in the frequency domain.

Point A serves as a common reference point of a resource block grid and may be obtained as follows.

offsetToPointA for PCell downlink represents a frequency offset between the point A and a lowest subcarrier of a lowest resource block that overlaps a SS/PBCH block used by the UE for initial cell selection, and is expressed in units of resource blocks assuming 15 kHz subcarrier spacing for FR1 and 60 kHz subcarrier spacing for FR2;

absoluteFrequencyPointA represents frequency-location of the point A expressed as in absolute radio-frequency channel number (ARFCN).

The common resource blocks are numbered from 0 and upwards in the frequency domain for subcarrier spacing configuration $\mu$.

The center of subcarrier 0 of common resource block 0 for the subcarrier spacing configuration $\mu$ coincides with 'point A'. A common resource block number $n_{CRB}^{\mu}$ in the frequency domain and resource elements (k, l) for the subcarrier spacing configuration $\mu$ may be given by the following Equation 1.

$$n_{CRB}^{\mu} = \left\lfloor \frac{k}{N_{sc}^{RB}} \right\rfloor \quad \text{[Equation 1]}$$

Here, k may be defined relative to the point A so that k=0 corresponds to a subcarrier centered around the point A. Physical resource blocks are defined within a bandwidth part (BWP) and are numbered from 0 to $N_{BWP,i}^{size}-1$, where i is No. of the BWP. A relation between the physical resource block $n_{PRB}$ in BWP i and the common resource block $n_{CRB}$ may be given by the following Equation 2.

$$n_{CRB} = n_{PRB} + N_{BWP,i}^{start} \quad \text{[Equation 2]}$$

Here, $N_{BWP,i}^{start}$ may be the common resource block where the BWP starts relative to the common resource block 0.

Bandwidth Part, BWP

An NR system may be supported up to a maximum of 400 MHz per one component carrier (CC). If a terminal operating in such a wideband CC operates with its RF for all CCs being turned on, terminal battery consumption may be increased. Alternatively, if several use cases (e.g., eMBB, URLLC, Mmtc, V2X) operating within one wideband CC are taken into consideration, a different numerology (e.g., sub-carrier spacing) for each frequency band within the corresponding CC may be supported. Alternatively, the capability of a maximum bandwidth may be different for each terminal. A base station may indicate that the terminal operates only in some bandwidth not the full bandwidth of the wideband CC by taking the capacity into consideration. The corresponding some bandwidth is defined as a bandwidth part (BWP), for convenience sake. The BWP may be configured with resource blocks (RBs) contiguous on a frequency axis, and may correspond to one numerology (e.g., sub-carrier spacing, CP length, slot/mini-slot duration).

Meanwhile, a base station may configure multiple BWPs within one CC configure in a terminal. For example, in a PDCCH monitoring slot, a BWP occupying a relatively small frequency domain may be configured, and a PDSCH indicated in a PDCCH may be scheduled on a BWP greater than the configured BWP. Alternatively, if UEs are crowded in a specific BWP, some UEs may be configured in other BWP for load balancing. Alternatively, some spectrum at the center of a full bandwidth may be excluded by taking into consideration frequency domain inter-cell interference cancellation between neighbor cells, and BWPs on both sides may be configured in the same slot. That is, the base station may configure at least one DL/UL BWP in a terminal associated with a wideband CC, may activate at least one DL/UL BWP of DL/UL BWP(s) (by L1 signaling or MAC CE or RRC signaling) configured in a specific time. Switching to another configured DL/UL BWP (by L1 signaling or MAC CE or RRC signaling) may be indicated or switching to a predetermined DL/UL BWP may be performed when a timer value expires based on a timer. In this case, the activated DL/UL BWP is defined as an active DL/UL BWP. However, if a terminal is in an initial access process or in a situation before an RRC connection is set up, the terminal may not receive a configuration for a DL/UL BWP. In such a situation, a DL/UL BWP assumed by the terminal is defined as an initial active DL/UL BWP.

Self-Contained Structure

A time division duplexing (TDD) structure taken into consideration in an NR system is a structure in which both uplink (UL) and downlink (DL) are processed in one slot (or subframe). This is for minimizing latency of data transmission in the TDD system. The structure may be referred to as a self-contained structure or a self-contained slot.

FIG. 6 shows an example of a self-contained structure according to some implementations of this disclosure. FIG. 6 is merely for convenience of description and does not limit the scope of the disclosure.

Referring to FIG. 6, as in the case of legacy LTE, a case where one transmission unit (e.g., slot, subframe) is configured with 14 orthogonal frequency division multiplexing (OFDM) symbols is assumed.

In FIG. 6, a region 602 means a downlink control region, and a region 604 means an uplink control region. Furthermore, regions (i.e., regions not having separate indication) except the region 602 and the region 604 may be used for the transmission of downlink data or uplink data.

That is, uplink control information and downlink control information may be transmitted in one self-contained slot. In contrast, in the case of data, uplink data or downlink data may be transmitted in one self-contained slot.

If the structure shown in FIG. 6 is used, downlink transmission and uplink transmission are sequentially performed and the transmission of downlink data and the reception of uplink ACK/NACK may be performed within one self-contained slot.

Consequently, when an error occurs in data transmission, the time consumed up to the retransmission of data can be reduced. Accordingly, latency related to data forwarding can be minimized.

In a self-contained slot structure, such as FIG. 6, there is a need for a time gap for a process of a base station (eNodeB, eNB, gNB) and/or a terminal (user equipment (UE)) changing from a transmission mode to a reception mode or of the base station and/or the terminal changing from a reception mode to a transmission mode. In relation to the time gap, when uplink transmission is performed after downlink transmission in a self-contained slot, some OFDM symbol(s) may be configured as a guard period (GP).

Method for Transmitting and Receiving Wireless Signal

FIG. 7 shows an example of a method of transmitting and receiving a signal.

Referring to FIG. 7, when the UE is powered on or newly enters a cell, the UE performs an initial cell search operation such as synchronizing with the eNB (S701). To this end, the UE may receive a Primary Synchronization channel (P-SCH) and a Secondary Synchronization channel (S-SCH) from the eNB and synchronize with the eNB and acquire information such as a cell ID or the like. Thereafter, the UE may receive a Physical Broadcast Channel (PBCH) from the eNB and acquire in-cell broadcast information. Meanwhile, the UE receives a Downlink Reference Signal (DL RS) in an initial cell search step to check a downlink channel status.

A UE that completes the initial cell search receives a Physical Downlink Control Channel (PDCCH) and a Physical Downlink Control Channel (PDSCH) according to information loaded on the PDCCH to acquire more specific system information (S702).

Meanwhile, when there is no radio resource first accessing the eNB or for signal transmission, the UE may perform a Random Access Procedure (RACH) to the eNB (S703 to S706). To this end, the UE may transmit a specific sequence to a preamble through a Physical Random Access Channel (PRACH) (S703 and S705) and receive a response message for the preamble through the PDCCH and a corresponding PDSCH (S704 and S706). In the case of a contention based RACH, a Contention Resolution Procedure may be additionally performed.

The UE that performs the above procedure may then perform PDCCH/PDSCH reception (S707) and Physical Uplink Shared Channel (PUSCH)/Physical Uplink Control Channel (PUCCH) transmission (S708) as a general uplink/downlink signal transmission procedure. In particular, the UE may receive Downlink Control Information (DCI) through the PDCCH. Here, the DCI may include control information such as resource allocation information for the UE and formats may be different according to a use purpose.

Meanwhile, the control information which the UE transmits to the eNB through the uplink or the UE receives from the eNB may include a downlink/uplink ACK/NACK signal, a Channel Quality Indicator (CQI), a Precoding Matrix Index (PMI), a Rank Indicator (RI), and the like. In the case of 3GPP LTE system, the UE may transmit the control information such as the CQI/PMI/RI, etc., through the PUSCH and/or PUCCH.

Table 4 shows an example of a DCI format in NR system.

TABLE 4

| DCI format | Usage |
|---|---|
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |

Referring to Table 4, DCI format 0_0 is used to schedule the PUSCH in one cell.

The information contained in DCI format 0_0 may be CRC scrambled by the C-RNTI or CS-RNTI or MCS-C-RNTI and transmitted. DCI format 0_1 is used to reserve the PUSCH in one cell. The information contained in DCI format 0_1 may be CRC scrambled by the C-RNTI, CS-RNTI, SP-CSI-RNTI or MCS-C-RNTI and transmitted. DCI format 1_0 is used to schedule the PDSCH in one DL cell. The information contained in DCI format 10 may be CRC scrambled by the C-RNTI or CS-RNTI or MCS-C-RNTI and transmitted. DCI format 1_1 is used to schedule the PDSCH in one cell. The information contained in DCI format 1_1 may be CRC scrambled by the C-RNTI or CS-RNTI or MCS-C-RNTI and transmitted. DCI format 2_1 is used to indicate PRB(s) and OFDM symbol(s) that may be assumed not to be transmitted by the UE.

The following information contained in DCI format 2_1 is CRC scrambled by the INT-RNTI and transmitted.

CSI Related Operation

In New Radio (NR) system, a channel state information-reference signal is used for time/frequency tracking, CSI computation, L1 (layer 1)-reference signal received power (RSRP) computation and mobility. Here, the CSI computation is related to a CSI acquisition, and L1-RSRP computation is related to a beam management (BM).

The CSI indicates all types of information indicative of a quality of a radio channel (or link) formed between a UE and an antenna port.

FIG. 8 is a flowchart illustrating an example of a CSI-related procedure.

Referring to FIG. 8, in order to perform one of the uses of CSI-RS, a terminal (e.g., a UE) receives CSI related configuration information from a base station (e.g., a general node B (gNB)) through a radio resource control (RRC) signaling (S810).

The CSI-related configuration information may include at least one of CSI interference management (IM) resource-related information, CSI measurement configuration-related information, CSI resource configuration-related information, CSI-RS resource-related information, or CSI reporting configuration-related information.

The CSIIM resource-related information may include CSI-IM resource information, CSI-IM resource set information, etc. The CSI-IM resource set is identified by a CSI-IM resource set ID (identifier), and one resource set includes at least one CSI-IM resource. Each CSI-IM resource is identified by a CSI-IM resource ID.

The CSI resource configuration-related information may be expressed as CSI-REsourceConfig IE. The CSI resource configuration-related information defines a group including at least one of a non-zero power (NZP) CSI-RS resource set, a CSI-IM resource set, or a CSI-SSB resource set. That is, the CSI resource configuration-related information includes a CSI-RS resource set list, and the CSI-RS resource set list may include at least one of a NZP CSI-RS resource set list, a CSI-IM resource set list, or a CSI-SSB resource set list. The CSI-RS resource set is identified by a CSI-RS resource set ID, and one resource set includes at least one CSI-RS resource. Each CSI-RS resource is identified by a CSI-RS resource ID.

Table 5 shows an example of the NZP CSI-RS resource set IE. Referring to Table 5, parameters indicating the use of CSI-RS for each NZP CSI-RS resource set (eg, a "repetition" parameter related to BM, a "trs-Info" parameter related to tracking) may be set.

TABLE 5

```
-- ASN1START
-- TAG-NZP-CSI-RS-RESOURCESET-START
NZP-CSI-RS-ResourceSet ::=         SEQUENCE {
  nzp-CSI-ResourceSetId            NZP-CSI-RS-ResourceSetId,
  nzp-CSI-RS-Resources             SEQUENCE (SIZE
```

TABLE 5-continued

```
(1..maxNrofNZP-CSI-RS-ResourcesPerSet)) OF NZP-CSI-RS-ResourceId,
  repetition                       ENUMERATED { on, off }
                                   OPTIONAL,
  aperiodicTriggeringOffset        INTEGER ( 0 . . 4 )
                                   OPTIONAL, - - Need S
  trs-Info                         ENUMERATED { true }
                                   OPTIONAL, -- Need R
  ...
}
-- TAG-NZP-CSI-RS-RESOURCESET-STOP
-- ASN1 STOP
```

In addition, the parameter repetition corresponding to a higher layer parameter corresponds to "CSI-RS-ResourceRep" of L1 parameter.

The CSI reporting configuration related information includes the parameter reportConfigType indicative of a time domain behavior and the parameter reportQuantity indicative of a CSI-related quantity to be reported. The time domain behavior may be periodic, aperiodic, or semi-persistent.

In addition, the CSI reporting configuration-related information may be represented as CSI-ReportConfig IE, and Table 6 shows an example of the CSI-ReportConfig IE.

TABLE 6

```
-- ASN1START
-- TAG-CSI-RESOURCECONFIG-START
CSI-ReportConfig ::=               SEQUENCE {
  reportConfigId                   CSI-ReportConfigId,
  carrier                          ServCellIndex                 OPTIONAL,
  -- Need S
  resourcesForChannelMeasurement   CSI-ResourceConfigId,
  csi-IM-ResourcesForInterference  CSI-ResourceConfigId          OPTIO
NAL, -- Need R
  nzp-CSI-RS-ResourcesForInterference  CSI-ResourceConfigId      OPT
IONAL, -- Need R
  reportConfigType                 CHOICE {
    periodic                       SEQUENCE {
      reportSlotConfig             CSI-ReportPeriodicityAndOffset,
      pucch-CSI-ResourceList       SEQUENCE (SIZE (1..maxNr
ofBWPs)) OF PUCCH-CSI-Resource
    },
    semiPersistentOnPUCCH          SEQUENCE {
      reportSlotConfig             CSI-ReportPeriodicityAndOffset,
      pucch-CSI-ResourceList       SEQUENCE (SIZE (1..maxNr
ofBWPs)) OF PUCCH-CSI-Resource
    },
    semiPersistentOnPUSCH          SEQUENCE {
      reportSlotConfig             ENUMERATED {sl5, sl10, sl20,
sl40, sl80, sl160, sl320},
      reportSlotOffsetList         SEQUENCE (SIZE (1.. maxNrofUL-
Allocations)) OF INTEGER(0..32),
      p0alpha                      P0-PUSCH-AlphaSetId
    },
    aperiodic                      SEQUENCE {
      reportSlotOffsetList         SEQUENCE (SIZE (1..maxNrof UL-Al
locations)) OF INTEGER(0..32)
    }
  },
  reportQuantity                   CHOICE {
    none                           NULL,
    cri-RI-PMI-CQI                 NULL,
    cri-RI-i1                      NULL,
    cri-RI-i1-CQI                  SEQUENCE {
      pdsch-BundleSizeForCSI       ENUMERATED {n2, n4}
    OPTIONAL
    },
    cri-RI-CQI                     NULL,
    cri-RSRP                       NULL,
    ssb-Index-RSRP                 NULL,
    cri-RI-LI-PMI-CQI              NULL
  },
``` the UE measures CSI based on configuration information related to the CSI (S820). Measuring the CSI may include (1) receiving a CSI-RS by the UE (S821) and (2) computing CSI based on the received CSI-RS (S822). A detailed description will be given later.

Regarding the CSI-RS, resource element (RE) mapping of CSI-RS resources of the CSI-RS is performed in time and frequency domains by higher layer parameter CSI-RS-ResourceMapping.

Table 7 shows an example of CSI-RS-ResourceMapping IE.

TABLE 7

```
-- ASN1START
-- TAG-CSI-RS-RESOURCEMAPPING-START
CSI-RS-ResourceMapping ::=         SEQUENCE {
    frequencyDomainAllocation         CHOICE {
        row1                              BIT STRING (SIZE (4)),
        row2                              BIT STRING (SIZE (12)),
        row4                              BIT STRING (SIZE (3)),
        other                             BIT STRING (SIZE (6))
    },
    nrofPorts                         ENUMERATED {p1,p2,p4,p8,p12,p16,p24,p32},
    firstOFDMSymbolInTimeDomain        INTEGER (0..13),
    firstOFDMSymbolInTimeDomain2       INTEGER ( 2 . . 12 )
                                      OPTIONAL, -- Need R
    cdm-Type                          ENUMERATED {noCDM, fd-CDM2, cdm4-FD2-TD2, cdm8-FD2-TD4},
    density                           CHOICE {
        dot5                              ENUMERATED {evenPRBs, oddPRBs},
        one                               NULL,
        three                             NULL,
        spare                             NULL
    },
    freqBand                          CSI-FrequencyOccupation,
    ...
}
```

In Table 7, a density (D) indicates a density of CSI-RS resources measured in a RE/port/physical resource block (PRB), and nrofPorts indicates the number of antenna ports.

In addition, the UE reports the measured CSI to the base station (S830).

Herein, when a quantity of CSI-ReportConfig in Table 6 is set to "none(or No report)", the UE may skip the reporting.

However, even when the quantity is set to "none(or No report)", the UE may report the measured CSI to the base station.

The case where the quantity is set to "none" is t when an aperiodic TRS is triggered or when repetition is set.

Herein, it may be defined such that reporting by the UE is omitted only when repetition is set to "ON".

CSI Measurement

The NR system supports more flexible and dynamic CSI measurement and reporting. Herein, the CSI measurement may include receiving a CSI-RS, and acquiring CSI by computing the received CSI-RS.

As time domain behaviors of CSI measurement and reporting, aperiodic/semi-persistent/periodic channel measurement (CM) and interference measurement (IM) are supported. To configure CSI-IM, four port NZP CSI-RS RE patterns are used.

CSI-IM-based IMR of NR has a design similar to CSI-IM of LTE and is configured independent of ZP CSI-RS resources for PDSCH rate matching. In addition, each port in the NZP CSI-RS-based IMR emulates an interference layer having (a desirable channel and) a pre-coded NZP CSI-RS. This is about intra-cell interference measurement of a multi-user case, and it primarily targets MU interference.

At each port of the configured NZP CSI-RS-based IMR, the base station transmits the pre-coded NZP CSI-RS to the UE.

The UE assumes a channel/interference layer for each port in a resource set, and measures interference.

If there is no PMI or RI feedback for a channel, a plurality of resources are configured in a set and the base station or network indicates, through DCI, a subset of NZP CSI-RS resources for channel/interference measurement.

Resource setting and resource setting configuration will be described in more detail.

Resource Setting

Each CSI resource setting "CSI-ResourceConfig" includes configuration of S≥1 CSI resource set (which is given by higher layer parameter "csi-RS-ResourceSetList"). A CSI resource setting corresponds to CSI-RS-resource-setlist. Herein, S represents the number of configured CSI-RS resource sets. Herein, configuration of S≥1 CSI resource set includes each CSI resource set including CSI-RS resources (composed of NZP CSI-RS or CSI-IM), and a SS/PBCH block (SSB) resource used for L1-RSRP computation.

Each CSI resource setting is positioned at a DL bandwidth part (BWP) identified by higher layer parameter bwp-id. In addition, all CSI resource settings linked to a CSI reporting setting have the same DL BWP.

In a CSI resource setting included in CSI-ResourceConfig IE, a time domain behavior of a CSI-RS resource may be indicated by higher layer parameter resourceType and may be configured to be aperiodic, periodic, or semi-persistent. The number S of CSI-RS resource sets configured for periodic and semi-persistent CSI resource settings is restricted to "1". A periodicity and a slot offset configured for periodic and semi-persistent CSI resource settings are given from a numerology of related DL BWP, just like being given by bwp-id.

When the UE is configured with a plurality of CSI-ResourceConfig including the same NZP CSI-RS resource ID, the same time domain behavior is configured for the CSI-ResourceConfig.

When the UE is configured with a plurality of CSI-ResourceConfig having the same CSI-IM resource ID, the same time domain behavior is configured for the CSI-ResourceConfig.

Then, one or more CSI resource settings for channel measurement (CM) and interference measurement (IM) are configured through higher layer signaling.

A CSI-IM resource for interference measurement.
An NZP CSI-RS resource for interference measurement.
An NZP CSI-RS resource for channel measurement.

That is, a channel measurement resource (CMR) may be an NZP CSI-RS for CSI acquisition, and an interference measurement resource (IMR) may be an NZP CSI-RS for CSI-IM and for IM.

Herein, CSI-IM (or a ZP CSI-RS for IM) is primarily used for inter-cell interference measurement.

In addition, an NZP CSI-RS for IM is primarily used for intra-cell interference measurement from multi-user.

The UE may assume that a CSI-RS resource(s) and a CSI-IM/NZP CSI-RS resource(s) for interference measurement configured for one CSI reporting is "QCL-TypeD" for each resource.

Resource Setting Configuration

As described above, a resource setting may represent a resource set list.

Regarding aperiodic CSI, each trigger state configured using higher layer parameter "CSI-AperiodicTriggerState" is that each CSI-ReportConfig is associated with one or multiple CSI-ReportConfig linked to a periodic, semi-persistent, or aperiodic resource setting.

One reporting setting may be connected to three resource settings at maximum.

When one resource setting is configured, a resource setting (given by higher layer parameter resourcesForChannelMeasurement) is about channel measurement for L1-RSRP computation.

When two resource settings are configured, the first resource setting (given by higher layer parameter resourcesForChannelMeasurement) is for channel measurement and the second resource setting (given by csi-IM-ResourcesForInterference or nzp-CSI-RS-ResourcesForInterference) is for CSI-IM or for interference measurement performed on an NZP CSI-RS.

When three resource settings are configured, the first resource setting (given by resourcesForChannelMeasurement) is for channel measurement, the second resource setting (given by csi-IM-ResourcesForInterference) is for CSI-IM based interference measurement, and the third resource setting (given by nzp-CSI-RS-ResourcesForInterference) is for NZP CSI-RS based interference measurement.

Regarding semi-persistent or periodic CSI, each CSI-ReportConfig is linked to a periodic or semi-persistent resource setting.

When one resource setting (given by resourcesForChannelMeasurement) is configured, the resource setting is about channel measurement for L1-RSRP computation.

When two resource settings are configured, the first resource setting (given by resourcesForChannelMeasurement) is for channel measurement, and the second resource setting (given by the higher layer parameter "csi-IM-ResourcesForInterference") is used for interference measurement performed on CSI-IM.

CSI Computation

If interference measurement is performed on CSI-IM, each CSI-RS resource for channel measurement is associated with a CSI-RS resource in a corresponding resource set by an order of CSI-RS resources and CSI-IM resources. The number of CSI-RS resources for channel measurement is the same as the number of CSI-IM resources.

In addition, when interference measurement is performed on an NZP CSI-RS, the UE is not expected to be configured with one or more NZP CSI-RS resources in an associated resource set within a resource setting for channel measurement.

A UE configured with higher layer parameter nzp-CSI-RS-ResourcesForInterference is not expected to be configured with 18 or more NZP CSI-RS ports in a NZP CSI-RS resource set.

For CSI measurement, the UE assumes the following.
  Each NZP CSI-RS port configured for interference measurement corresponds to an interference transmission layer.
  Every interference transmission layer of NZP CSI-RS ports for interference measurement considers an energy per resource element (EPRE) ratio.
  A different interference signal on a RE(s) of an NZP CSI-RS resource for channel measurement, an NZP CSI-RS resource for interference measurement, or a CSI-IM resource for interference measurement.

CSI Reporting

For CSI reporting, time and frequency resources available for an UE are controlled by a base station.

CSI may include at least one of channel quality indicator (CQI), a precoding matrix indicator (PMI), a CSI-RS resource indicator (CRI), am SS/PBCH block resource indicator (SSBRI), a layer indicator (LI), a rank indicator (RI), or L1-RSRP.

Regarding the CQI, the PMI, the CRI, the SSBRI, the LI, the RI, and the L1-RSRP, the UE may be configured with $N \geq 1$ CSI-ReportConfig reporting setting, $M \geq 1$ CSI-ResourceConfig resource setting, and a list of one or two trigger states (provided by aperiodicTriggerStateList and semiPersistentOnPUSCH-TriggerStateList) by a higher layer. In the aperiodicTriggerStateList, each trigger state includes a channel and a list of associated CSI-ReportConfigs selectively indicative of Resource set IDs for interference. In the semiPersistentOnPUSCH-TriggerStateList, each trigger state includes one associated CSI-ReportConfig.

In addition, a time domain behavior of CSI reporting supports periodic, semi-persistent, and aperiodic CSI reporting.

i) The periodic CSI presorting is performed on a short PUCCH and a long PUCCH. A periodicity and a slot offset of the periodic CSI reporting may be configured by RRC and refer to CSI-ReportConfig IE.

ii) SP CSI reporting is performed on a short PUCCH, a long PUCCH, or a PUSCH.

In the case of SP CSI on a short/long PUCCH, a periodicity and a slot offset are configured by RRC, and CSI reporting to an additional MAC CE is activated/deactivated.

In the case of SP CSI on a PUSCH, a periodicity of SP CSI reporting is configured by RRC, but a slot offset thereof is not configured by RRC and SP CSI reporting is activated/deactivated by DCI (format 0_1). For SP CSI reporting on a PUSCH, a separated RNTI (SP-CSI C-RNTI) is used.

The first CSI reporting timing follows a PUSCH time domain allocation value indicated by DCI, and subsequent CSI reporting timing follows a periodicity which is configured by RRC.

DCI format 0_1 may include a CSI request field and activate/deactivate a specific configured SP-CSI trigger state. SP CSI reporting is activated/deactivated identically or similarly to a mechanism having data transmission on a SPS PUSCH.

iii) Aperiodic CSI reporting is performed on a PUSCH and triggered by DCI. In this case, information related to the trigger of aperiodic CSI reporting may be transmitted/instructed/configured through MAC-CE.

In the case of AP CSI having an AP CSI-RS, an AP CSI-RS timing is configured by RRC. Herein, a timing of AP CSI reporting is dynamically controlled by DCI.

A reporting method (e.g., transmitting in order of RI, WB, PMI/CQI, and SB PMI/CQI) by which CSI is divided and reported in a plurality of reporting instances, the method which is applied for PUCCH-based CSI reporting in LTE, is not applied in NR. Instead, NR restricts configuring specific CSI reporting on a short/long PUCCH, and a CSI omission rule is defined. And, regarding an AP CSI reporting timing, PUSCH symbol/slot location is dynamically indicated by DCI. In addition, candidate slot offsets are configured by RRC. Regarding CSI reporting, a slot offset(Y) is configured for each reporting setting. Regarding UL-SCH, a slot offset K2 is configured separately.

Two CSI latency classes (low latency class and high latency class) are defined in terms of CSI computation complexity. The low latency CSI is WB CSI that includes up to 4-ports Type-I codebook or up to 4-ports non-PMI feedback CSI. The high latency CSI is a CSI other than the low latency CSI. Regarding a normal UE, (Z, Z') is defined in a unit of OFDM symbols. Herein, Z represents the minimum CSI processing time after receiving CSI triggering DCI and before performing CSI reporting. And, Z' represents the minimum CSI processing time after receiving CSI-RS about a channel/interference and before performing CSI reporting Additionally, the UE reports the number of CSI which can be calculated at the same time.

Table 8 below represents a CSI reporting configuration defined in TS38.214.

[Table 8]

TABLE 5.2.1.4-1

Triggering/Activation of CSI Reporting for the possible CSI-RS Configurations.

| CSI-RS Configuration | Periodic CSI Reporting | Semi-Persistent CSI Reporting | Aperiodic CSI Reporting |
|---|---|---|---|
| Periodic CSI-RS | No dynamic triggering/activation | For reporting on PUCCH, the UE receives an activation command [10, TS 38.321]; for reporting on PUSCH, the UE receives triggering on DCI | Triggered by DCI; additionally, activation command [10, TS 38.321] possible as defined in Subclause 5.2.1.5.1. |
| Semi-Persistent CSI-RS | Not Supported | For reporting on PUCCH, the UE receives an activation command [10, TS 38.321]; for reporting on PUSCH, the UE receives triggering on DCI | Triggered by DCI; additionally, activation command [10, TS 38.321] possible as defined in Subclause 5.2.1.5.1. |
| Aperiodic CSI-RS | Not Supported | Not Supported | Triggered by DCI; additionally, activation command [10, TS 38.321] possible as defined in Subclause 5.2.1.5.1. |

In addition, Table 9 below represents information related to activation/deactivation/trigger by a MAC-CE in relation to Semi-Persistent/Aperiodic CSI reporting defined in TS38.321.

TABLE 9

5.18.2 Activation/Deactivation of Semi-persistent CSI-RS/CSI-IM resource set
  The network may activate and deactivate the configured Semi-persistent CSI-RS/CSI-IM resource sets of a Serving Cell by sending the SP CSI-RS/CSI-IM Resource Set Activation/Deactivation MAC CE described in subclause 6.1.3.12. The configured Semi-persistent CSI-RS/CSI-IM resource sets are initially deactivated upon configuration and after a handover.
  The MAC entity shall:
    1> if the MAC entity receives an SP CSI-RS/CSI-IM
      Resource Set
    Activation/Deactivation MAC CE on a Serving Cell:
    2> indicate to lower layers the information regarding the SP CSI-RS/CSI-IM Resource Set Activation/Deactivation MAC CE.
5.18.3 Aperiodic CSI Trigger State subselection
  The network may select among the configured aperiodic CSI trigger states of a Serving Cell by sending the Aperiodic CSI Trigger State Subselection MAC CE described in subclause 6.1.3.13
  The MAC entity shall:
    1> if the MAC entity receives an Aperiodic CSI trigger State Subselection MAC CE on a Serving Cell:
    2> indicate to lower layers the information regarding Aperiodic CSI trigger State Subselection MAC CE.

CSI Reporting Using PUSCH

The aperiodic CSI reporting performed in PUSCH supports wideband and subband frequency subdivisions. The aperiodic CSI reporting performed in PUSCH supports Type I and Type II CSI.

SP CSI reporting for PUSCH supports Type I and Type II CSI with wide band band and subband frequency granularity. PUSCH resource for SP CSI reporting and Modulation and Coding Scheme (MCS) are semi-permanently assigned by UL DCI.

CSI reporting for PUSCH may include Part 1 and Part 2. Part 1 is used to identify the number of information bits of the Part 2. Part 1 is transferred completely before the Part 2.

Part 1 in connection with Type I CSI feedback includes an RI (if it is reported), a CRI (if it is reported) and a CQI of the first code word. Part 2 includes a PMI. When RI>4, Part 2 contains a CQI.

For Type II CSI feedback, Part 1 has a fixed payload size and includes an indication (N_IND) indicating the number of non-zero wideband amplitude coefficients for each layer of an RI, a CQI and Type II CSI. Part 2 includes PMI of Type II CSI.

In the case that CSI reporting includes 2 parts in PUSCH and CSI payload to report is less than the payload size provided by the allocated PUSCH resources for CSI reporting, the UE may omit some of the Part 2 CSI.

Part 2 CSI omission is determined according to the priority. Priority 0 is the highest priority, and $2N_{Rep}$ is the lowest priority.

CSI Reporting Using PUCCH

The UE may set a plurality of periodic CSI reports corresponding to CSI reporting configuration indications made up of one or more higher layers. A CSI measurement link and CSI resource setting are configured in an upper layer.

The periodic CSI reporting at PUCCH format 2, 3, or 4 supports Type I CSI based on the optical bandwidth.

For SP CSI on PUSCH, after HARQ-ACK corresponding to PDSCH carrying selection command at slot n, the UE performs an SP CSI reporting for PUCCH at slot n+3 $N_{slot}^{subframe,\mu}+1$.

The selection command includes one or more report setting indications in which the associated CSI resource configuration is configured.

The SP CSI report supports Type I CSI in PUCCH.

The SP CSI report in PUCCH format 2 supports Type I CSI with broad bandwidth frequency granularity. The SP CSI report of PUCCH format 3 or 4 supports Type I sub-band CSI and Type II CSI with a wide bandwidth granularity.

When PUCCH carries Type I CSI with broad bandwidth frequency granularity, a CSI payload carried by PUCCH format 2 and PUCCH format 3 or 4 are identical to a CRI (if it is reported), regardless an RI.

In PUCCH format 3 or 4 Type I CSI sub-band payload is divided into two portions.

The first part (Part 1) includes an RI of the first code word, (reported) a CRI and (reported) a CQI. The second part (Part 2) includes a PMI, and when RI>4, the second part (Part 2) includes a CQI of the second codeword.

The SP CSI reporting performed in PUCCH format 3 or 4 supports Type II CSI feedback but supports only Part 1 of Type II CSI feedback.

In PUCCH format 3 or 4 that supports Type II CSI feedback, a CSI reporting may depend on a UE performance.

The Type II CSI reporting transmitted in PUCCH format 3 or 4 (only Part 1 is concerned among them) is calculated independently of Type II CSI reporting performed in PUSCH.

When the UE is configured with CSI reporting in PUCCH format 2, 3, or 4, each PUCCH resource is configured for each candidate UL BWP.

In the case that the UE receives the active SP CSI reporting configuration in PUCCH and does not receive the deactivation command, a CSI reporting is performed in the case that a CSI reporting BWP is an active BWP, otherwise a CSI reporting is temporarily suspended. This operation also applies to SP CSI of PUCCH. For a PUSCH based SP CSI reporting, when a BWP commutation occurs, the corresponding CSI reporting is automatically deactivated.

Depending on a length of PUCCH transmission, a PUCCH format may be classified into a short PUCCH or a long PUCCH. PUCCH formats 0 and 2 may be referred to as a short PUCCH, and PUCCH formats 1, 3, and 4 may be referred to as a long PUCCH.

For a PUCCH-based CSI reporting, a short PUCCH-based CSI reporting and a long PUCCH-based CSI reporting will be described in detail below.

The short PUCCH-based CSI reporting is only used for wideband CSI reporting. The short PUCCH-based CSI report has the same payload regardless of RI/CRI of a slot given to avoid blind decoding.

The size of the information payload may differ between the maximum CSI-RS ports of CSI-RS configured in a CSI-RS resource set.

In the case that the payload containing a PMI and a CQI is diversified to include RI/CQI, a padding bit is added to RI/CRI/PMI/CQI before the encoding procedure to equalize the payload associated with the other RI/CRI value. Furthermore, RI/CRI/PMI/CQI may be encoded with a padding bit, if necessary.

For a broadband reporting, the long PUCCH-based CSI reporting may use the same solution as the short PUCCH-based CSI reporting.

The long PUCCH-based CSI report uses the same payload regardless of RI/CRI. In the case of a sub-band report, two-part encoding (for Type I) is applied.

Part 1 may have a fixed payload depending on the number of ports, a CSI type, an RI restriction, and the like, and Part 2 may have various payload sizes according to Part 1.

CSI/RI may be encoded first to determine a payload of PMI/CQI. In addition, CQIi (i=1, 2) corresponds to a CQI for the $i^{th}$ code word (CW).

For a long PUCCH, Type II CSI reporting may forward only Part 1.

Depending on a type and a part of each CSI feedback, a reported CSI parameter is different. A CSI parameter may be replaced by the term such as a CSI reporting parameter, a CSI component, and the like.

Table 10 exemplifies CSI parameters for each CSI feedback type and part on PUSCH.

TABLE 10

| | Part 1 | Part 2 |
|---|---|---|
| Type-I CSI feedback | RI (if reported) CRI (if reported) CQI for the $1^{st}$ codeword | PMI CQI for the $2^{nd}$ codeword (RI > 4) |
| Type-II CSI feedback | RI CQI Indication of the number ($N_{IND}$) (non-zero wideband amplitude coefficients per layer) | PMI |

Referring to Table 10, in relation to Type I CSI feedback, Part 1 includes an RI (if it is reported), a CRI (if it is reported), and a CQI of the first codeword. Part 2 includes a PMI, and when RI>4, Part 2 includes a CQI of the second codeword. For Type II CSI feedback, Part 1 has a fixed payload size and includes an indication (N_IND) indicating the number of non-zero wideband amplitude coefficients for an RI, a CQI and each layer. Part 2 includes a PMI.

Hereinafter, CSI parameters for each CSI feedback type and part represented in Table 10 are described.

As described above, in a wireless communication system (e.g., NR), a UE may feedback channel state information (e.g., RI/CQI/PMI/LI, etc.) to a base station. Like a CSI reporting on PUSCH, in the case that a UE reports CSI to a base station, the UE may transmit CSI based on a feedback resource capacity allocated to Uplink Control Information (UCI). That is, the UE may divide CSI parameters into Part 1 and Part 2 so as to fulfill the allocated (configured) CSI feedback resource capacity and transmits the channel state information according to a priority in each part by omitting a part of or the whole channel state information.

However, in order to improve a UE and system performance, in the Coordinated Multi-Point (CoMP) scenario in which multiple base stations exchange or utilize channel information feedbacked from a UE and operate in Joint transmission (JT), Coordinated scheduling (CS), Coordinated beamforming (CB), dynamic port selection (DPS), and the like, the following problems may occur for a CSI feedback. Particularly, in the case that a UE transmits CSI independently to each base station that performs a CoMP operation, the UE may feedback CSI in the CSI reporting method described above, but a resource waste occurs in time and/or frequency domain, and a loss may occur for the entire system performance. In addition, in the case that a UE generate CSI including all of channel state information of multiple base stations and transmits the channel state information to a specific base station, an amount of resource required for the feedback increases linearly as much as the number of base stations, and a problem occurs that a CSI reporting overhead increases significantly, and also the CSI reporting overhead exceeds a resource capacity configured in UCI.

FIG. 9 illustrates an example of a CoMP operation for which three transmission points (TPs) (or base stations) may share information for supporting a UE through backhaul. Referring to FIG. 9, a UE may measure and calculate each channel by utilizing a CSI-RS transmitted from each TP and feedback the measured channel state information to the TP. As described above, the UE may independently report the channel state information corresponding to each TP. In this case, a resource in time and/or frequency domain may be used as much as the number of TPs. For example, for a CSI feedback according to a scheduling of TP, CSI may be transmitted to each TP by using three time slots. Alternatively, the entire CSI for three TPs may be transmitted to a specific TP such as TP 1. Alternatively, CSI is generated with a part of CSI parameters among the channel state information of the TPs, and a CSI feedback may be performed by using the number of resources smaller than the number of resources for time domain or frequency domain as much as the number of TPs. The CSI transmitted in the method may be shared and utilized among TPs through backhaul.

In the situation that multiple TPs are operating in CoMP, it may be very important for a UE to transmit channel state information for multiple TPs measured by the UE to a specific TP or multiple TPs in an efficient way. Therefore, the present disclosure proposes a method for generating CSI by considering a feedback resource capacity of UCI when reporting channel state information for multiple TPs that support a CoMP operation.

In the present disclosure, it is assumed that a CSI feedback mode for multiple base stations that perform a CoMP operation is the same as Type I or Type II for all base stations. In addition, it is assumed that, for each CSI feedback type, a setting is the same as a wideband or a subband reporting for all base stations. Furthermore, it is assumed that a CSI feedback order is set in an ascending order of indices allocated or configured for base stations. However, these are just for the convenience of description, and the scope of the present disclosure is not limited thereto.

Accordingly, in the case that a different feedback mode are supported for each base station, when CSI is generated, each CSI feedback mode is configured, and the corresponding CSI parameters may be configured. In the case that reporting setting is different for each of multiple base stations, the base stations to which subband reporting is designated or allocated are grouped, and subband CSI may be designed according to the method proposed in the present disclosure. In addition, this may also be applied for an arbitrary CSI feedback order.

In the present disclosure, a base station may be substituted by a TP, and different TP may be connected to a different or the same base station, and may be interpreted as 'a unit of transmitting a downlink signal by applying different beam on different geographical position (or the same position)'. In other words, a possibility may exist, in which a large scale of fading undergone by a UE for a signal transmitted from each TP (e.g., path-loss, average Doppler shift, average latency, etc.) and/or a (transmission and) reception beam to be applied by the UE is different. Accordingly, the UE may assume a mutual quasi-co-location (QCL) for signals transmitted from the same TP and may not assume a mutual QCL for signals transmitted from different TPs.

Hereinafter, for the convenience of description, terms are unified as below. However, the terms do not limit the scope of the present disclosure.

TP: A transmission point and may be substituted by a base station.
WB: This represents a wideband.
SB: This represents a subband.
CSI: Channel State Information
RI: Rank Indicator
CRI: CSI-RS Resource Indicator
CQI: Channel Quality Information
PMI: Precoding Matrix Indicator
CW: Codeword
Part 1, Part 2: CSI Part 1, CSI Part 2
PUCCH: Physical Unlink Control Channel
PUSCH: Physical Unlink Shared Channel As a method for configuring a CSI reporting setting for multiple TPs, the following two methods may be considered.

A method of configuring a CSI reporting setting for each of TPs may be considered. The method corresponds to a method for configuring a separate reporting setting for each NZP CSI-RS resource set or NZP CSI-RS resource setting. Since a CSI reporting setting is configured for each TP, each TP may configure information to be reported, a time/frequency resource for reporting, and the like may be freely configured. On the other hand, considering the case that multiple TPs transmits data in the same resource, it may be difficulty in calculate CSI integrally (e.g., integral CQI considering integral interference between RI and TP), a UE implementation complexity may increase. Particularly, in the case that CSI is reported on PUCCH, there is a disadvantage that an independent reporting resource or container is required for each TP.

Table 11 represents an example that a separate reporting setting is configured for each TP.

TABLE 11

| Reporting setting | Parameters |
| --- | --- |
| CSI reporting setting #1 | Reporting parameters: Type I PMI, RI, CQI<br>Reporting behavior: periodic, semi-persistent on PUCCH, semi-persistent on PUSCH, or aperiodic<br>Reporting band: subband/wideband CQI, subband/wideband PMI, PRE set for reporting PUCCH resource ID<br>Reporting periodicity, slot offset<br>Etc, |
| CSI reporting setting #2 | Reporting parameters: Type I PMI, RI, CQI<br>Reporting behavior: periodic, semi-persistent on PUCCH, semi-persistent on PUSCH, or aperiodic<br>Reporting band: subband/wideband CQI, subband/wideband PMI, PRB set for reporting PUCCH resource ID<br>Reporting periodicity, slot offset<br>Etc. |

Even in the case that a separate reporting setting is configured for each TP, in the case of a CSI reporting on PUSCH, a reporting triggering state connected to multiple reporting settings is configured, and a transmission indication for multiple CSI reports may be available in a single reporting resource or container. Alternatively, even in the case of a CSI reporting on PUCCH, a PUCCH able to transmit multiple CSI reports to a single PUCCH may be configured (e.g., multi-CSI on PUCCH in NR), according to configuration/instruction of a base station, the multiple CSI reports on the PUCCH resource may be performed together.

Alternatively, a method of configuring a single Reporting setting for multiple TPs may be considered. The method corresponds to a method for configuring multiple NZP CSI-RS resource sets or NZP CSI-RS resource settings is configured in connection with a single reporting setting. In this case, since a CSI reporting for multiple TPs is performed on a single reporting resource or container, a reporting may be performed without regard to PUCCH or PUSCH.

Table 12 represents an example that a single CSI reporting setting is configured for multiple TPs.

TABLE 12

| Reporting setting | Parameters |
|---|---|
| CSI reporting setting #0 | Reporting parameters: Type I PMI1/RI1 for the first NZP CSI-RS resource set/setting, Type I PMI2/RI2 for the second NZP CSI-RS resource set/setting, CQI ( 간섭을 고려한 통합 layer 간복수 TP전송 시 CQI)<br>Reporting behavior: periodic, semi-persistent on PUCCH, semi-persistent on PUSCH, or aperiodic<br>Reporting band: subband/wideband CQI, subband/wideband PMI, PRB set for reporting PUCCH resource ID<br>Reporting periodicity, slot offset<br>Etc. |

Consequently, a UE may perform a CSI reporting for multiple TPs in one of the following three cases.

i) A PUSCH/PUCCH for multiple CSI reporting settings
ii) A PUSCH/PUCCH for a CSI reporting setting for CoMP operation
iii) Multiple PUSCH/PUCCH resources for multiple CSI reporting settings (one resource for one reporting setting, respectively)

Since more types of CSI information than the number of multiple TPs need to be included in a single PUSCH/PUCCH resource for items i) and ii), a CSI omission rule needs to be further optimized.

In relation to a method for reporting CSI in a single PUSCH or PUCCH for multiple CSI reporting settings, in the NR standard, the case is considered that CSI is feedbacked simultaneously on a single PUSCH for multiple reporting settings according to multiple component carriers (CCs).

Table 13 represents an example for CSI Part 2 omission rule in the case that CSI is reported on a single PUSCH for multiple reporting settings corresponding to multiple component carriers.

TABLE 13

| Priority | Omission rule |
|---|---|
| Priority 0: | Part 2 WB CSI for reporting from 1 to N |
| Priority 1: | Part 2 even SB CSI for reporting 1 |
| Priority 2: | Part 2 odd SB CSI for reporting 1 |
| Priority 3: | Part 2 even SB CSI for reporting 2 |
| Priority 4: | Part 2 odd SB CSI for reporting 2 |
| . | . |
| . | . |
| . | . |
| Priority 2N − 1: | Part 2 even SB CSI for reporting N |
| Priority 2N: | Part 2 odd SB CSI for reporting N |

Referring to Table 13, by setting Part 2 WB CSI for the entire component carriers as priority 0, and by setting Part 2 SB CSI for component carrier 1 as priority 1 and 2, an omission rule for Part 2 SB CSI for each component carrier may be applied.

In the case that the operation is applied to a CoMP operation scenario, a problem may occur that while a SB CSI reporting for a specific TP is performed, a SB CSI reporting for a part of TPs is thoroughly omitted. In addition, in the case that a reporting container size is not satisfied even for Part 1 CSI for multiple TPs, a problem may occur that a part of or the whole CSI is omitted. Therefore, in a CoMP operation that channel state information for multiple TPs is obtained and utilized, it is more efficient in the aspect of performance improvement to instruct a CSI reporting operation such that channel information of different base stations as possible within a limited reporting container size.

Hereinafter, for multiple TPs that perform a CoMP operation, in order to generate CSI according to a single CSI reporting setting for a CoMP operation, it is described a CSI parameter configuration method and an omission rule according to each CSI feedback type and part proposed in the present disclosure.

<Method 1>

In order to report CSI by reflecting channel state information for multiple TPs within a predetermined reporting container size efficiently, an omission rule for configuring Part 1 information for each CSI feedback type may be considered.

As represented in Table 10 above, according to respective CSI feedback types for all TPs, a CSI parameter corresponding to Part 1 may be configured as below. CSI parameters corresponding to Part 1 of Type I CSI feedback includes an RI (if it is reported), a CRI (if it is reported), and a WB CQI of the first CW. Part 1 of Type II CSI feedback has a fixed payload size, and CSI parameters include an information (N_IND) representing the number of non-zero wideband amplitude coefficients for an RI, a WB CQI, and each layer of Type II CSI feedback.

The priority of the Part 1 CSI parameters may be randomly configured by a base station and/or a UE or may be predefined as a specific order. In the case that the configured CSI exceeds a reporting container size, each of CSI parameters may be configured for each TP. Alternatively, according to the priority of a CSI omission rule, a CSI parameter of a low priority may be omitted. In this case, a base station may inform an omission rule to a UE to operate. Furthermore, a UE may further report a fact on whether Part 1 CSI is omitted or an omission rate to a TP. In addition, in the case that Part 1 CQI is omitted, Part 2 CSI for a corresponding subband may also be omitted.

On the other hand, in the case that a size of the configured CSI is smaller than a reporting container size, an SB CSI parameter may be additionally configured. For example, for Type I CSI feedback, an SB CQI for the first CW of an even number (odd number) of each TP and an SB CQI for the first CW of an odd number (even number) may be configured. For Type II CSI feedback, an SB CQI of an even number (odd number) of each TP and an SB CQI of an odd number (even number) may be configured. In this case, an SB CSI configuration order of each TP may follow a configuration order of Part 1 CSI. The method of reporting partial SB CSI by dividing an odd number and an even number for an SB CQI described above is just an example and does not limit the scope of the present disclosure. The partial SB reporting method for each TP may be randomly designated, and the detailed description will be followed.

Table 14 represent an example of an omission rule for CSI Part 1 proposed in the present disclosure.

TABLE 14

| Priority | Omission rule |
|---|---|
| Priority 0: | RI for TP 1 to N |
| Priority 1: | Part 1 WB CQI for TP from 1 to N |
| Priority 2: | Part 1 CRI or $N_{IND}$ for TP from 1 to N |

TABLE 14-continued

| Priority | Omission rule |
| --- | --- |
| Priority 3: | Part 1 SB even CQI for TP 1 |
| Priority 4: | Part 1 SB even CQI for TP 2 |
| . | . |
| . | . |
| . | . |
| Priority N + 2: | Part 1 SB even CQI for TP N |
| Priority N + 3: | Part 1 SB odd CQI for TP 1 |
| Priority N + 4: | Part 1 SB odd CQI for TP 2 |
| . | . |
| . | . |
| . | . |
| Priority 2N + 2: | Part 1 SB odd CQI for TP N |

Referring to Table 14, for a Part I CSI parameter according to a CSI feedback type, a priority of WB CSI of multiple TPs that perform a CoMP operation may be configured (defined) as higher than any other SB CSI. Particularly, a priority of RI information of each base station may be configured as 0, a priority of a WB CQI of each base station may be configured as 1, and a priority of CRI (or N_IND) of each base station may be configured as 2. The priority among the WB CSI parameters is described just for the convenience of description and does not limit the scope of the present disclosure. Accordingly, according to a differently configured/defined order, priorities 0, 1, and 2 of Part 1 WB CSI parameters may be configured.

Additionally, CSI Part 1 may be efficiently configured through a partial reporting of even number or odd number SB CQI for each TP. That is, a higher priority is configured for either one of an even number or an odd number of an SB CQI of each TP, and a reporting may be performed for an SB CQI partially. Through the operation, partial SB CQI information of a TP associated with a CoMP operation within a given reporting container size may be reported as much as possible, and through the SB CQI reporting according to a priority from N+3, an accuracy of CQI for each TP may be improved.

Particularly, in Type II CSI feedback mode, a payload size of Part 1 is fixed. Here, a payload size may be in relation to the number of ports for CSI-RS and may be determined by the number of ports for a serving base station or entire base stations. In this situation, in the case that calculated payload sizes of an RI, a WB CQI, and an N_IND for all base stations exceed a reporting container size, an omission rule may not be configured in the order of an RI, a WB CQI, and an N_IND for all base stations, like priorities 0, 1, and 2 represented in Table 14, but an omission rule may be configured (defined) according to priorities of an RI, a WB CQI, and an N_IND for all base stations. For example, priorities of CSI (e.g., an RI, a WB CQI, and an N_IND) of TP 1 may be configured as priorities 0, 1, and 2, and priorities of CSI (e.g., an RI, a WB CQI, and an N_IND) of TP 2 may be configured as priorities 3, 4, and 5. Through this, a situation may be prevented in which a specific CSI parameter is not reported ununiformly due to multiple base stations and a limited reporting container size.

In the method described above, the operation of dividing SB CSI parameters (e.g., SB CQI) for each base station into an even number or an odd number for a partial SB CSI reporting is described, but this is just for the convenience of description and does not limit the scope of the present disclosure. Accordingly, a base station and a UE may divide SB CSI parameters (e.g., SB CQI) according to a predetermined pattern and report it partially. In one example, SB CSI parameters may be divided into two or more groups in a comb form according to a specific rule, and CSI may be configured with parameters corresponding to some groups. Alternatively, a base station may instruct a specific operation to a UE, and the UE may feedback partial SB CSI (e.g., SB CQI) according to the instruction. Alternatively, the UE may follow a predetermined arbitrary method. The description for SB CSI parameters may also be applied to the methods and embodiments to be described below.

In an omission rule for configuring Part 1 information for each CSI feedback type, a priority for each TP may be considered.

A priority for each TP may be configured in an explicit or implicit manner. A TP may transmit a priority of TP and information related to a configuration method to a UE through a higher layer signaling (e.g., RRC or MAC CE).

For example, as one of the implicit manners, information of a WB CQI may be utilized in Part 1 CSI. A TP may determine a priority of TP based on the WB CQI information reported by a base station and inform the priority of TP to a UE. Alternatively, a TP may instruct a UE to determine a priority of TP by the WB CQI.

In another example, by utilizing information indicated explicitly, a priority of CSI parameters may be configured according to a priority of each TP. Like method 1 above, a preconfigured index (e.g., TP 1 to TP N) of each TP may be utilized as a priority of TP. TP 1 may be mapped to a higher priority, and TP N may be mapped to a lower priority.

In still another example, an index remapping scheme may be applied, in which an index of TP is provided again based on a priority for each TP which is configured through the explicit or implicit manner. As a specific example, in the case that a size of a WB CQI for three TPs is assumed to be in the order of TP 2>TP1>TP 3, a new index according to a priority may be mapped in the manner; TP (1*,2*,3*)=TP (2,3,1). Here, '*' means a new index according to a priority. ATP may inform an index remapping result to a UE. Alternatively, a UE may perform an index remapping and forward the result to a TP with CSI.

The method of determining a priority for each TP described above may also be applied to the case of considering a priority for each TP in the omission rule in method 2, method 3, and the like to be described below.

Table 15 represents Part 1 omission rule considering a priority for each TP to which a TP index remapping is applied.

TABLE 15

| Priority | Omission rule | Priority | Omission rule |
| --- | --- | --- | --- |
| Priority 0: | RI for TP 1* to N* | Priority 0: | RI for TP 1* to N* |
| Priority 1: | Part 1 CRI or $N_{IND}$ for TP from 1* to N* | Priority 1: | Part 1 CRI or $N_{IND}$ for TP from 1* to N* |
| Priority 2: | Part 1 WB CQI for TP from 1* to N* | Priority 2: | Part 1 WB CQI for TP 1* |
| Priority 3: | Part 1 SB even CQI for TP 1* | Priority 3: | Part 1 SB even CQI for TP 1* |
| Priority 4: | Part 1 SB odd CQI for TP 1* | Priority 4: | Part 1 SB odd CQI for TP 1* |
| Priority 5 | Part 1 SB even CQI for TP 2* | Priority 5 | Part 1 WB CQI for TP 2* |
| Priority 6: | Part 1 SB odd CQI for TP 2* | Priority 6: | Part 1 SB even CQI for TP 2* |

TABLE 15-continued

| Priority | Omission rule | Priority | Omission rule |
|---|---|---|---|
| . | . | . | . |
| . | . | . | . |
| . | . | . | . |
| Priority 2N + 1: | Part 1 SB even CQI for TP N* | Priority 2N + 1: | Part 1 SB even CQI for TP N* |
| Priority 2N + 2: | Part 1 SB odd CQI for TP N* | Priority 2N + 2: | Part 1 SB odd CQI for TP N* |

Referring to Table 15, based on a priority of TP, a CSI omission rule reflecting an importance of channel information for each TP may be configured (defined). In one example, priorities of WB CSI (e.g., an RI, a CRI, a CQI, etc.) may be configured as priorities 0, 1, and 2 so as to be reported for all TPs, and CSI may be generated by configuring a priority of SB CSI (e.g., an SB CQI) according to the priority of TP. Alternatively, CSI is preferentially generated with a WB CQI and an SB CQI of a TP of which priority is high and transmitted to the corresponding TP. Here, an indicator indicating whether to select a certain CSI omission rule to operate (or an object (operation) to reflect a priority and a new index as a result of remapping for an index of an existing TP need to be informed to a UE. Accordingly, a TP may transmit the indicator or information for the TP index to a UE.

<Method 2>

In order to perform a CSI reporting by reflecting channel state information for multiple TPs within a predetermined reporting container size efficiently, an omission rule for configuring Part 2 information for each CSI feedback type is proposed.

As represented in Table 10 above, a CSI feedback of Part 2 for all TPs may be configured as below according to each CSI feedback type. For WB CSI of each TP, Part 2 of Type I CSI feedback includes a PMI, and when RI>4, includes a CQI for the second CW. For WB CSI of each TP, Part 2 of Type II CSI feedback includes PMI. For SB CSI of each TP, Part 2 of Type I CSI feedback includes even number (odd number) SB PMI and odd number (even number) SB PMI, and when RI>4, includes even number (odd number) SB CQI and odd number (even number) SB CQI for the second CW. For SB CSI for each TP, Part 2 of Type II CSI feedback includes even number (odd number) SB PMI and odd number (even number) SB PMI.

Hereinafter, an operation of Type II CSI feedback mode is described. In this case, CSI may be interpreted as a PMI.

Table 16 represents an example of Part 2 CSI omission rule proposed in the present disclosure.

Referring to Table 16, a method may be considered, in which a WB PMI for each TP is preferentially configured in Part 2 CSI and partial SB CSI is configured in an order of an odd number or an even number. That is, an SB PMI of many TPs as possible may be included in a given reporting container size, there is an effect of improving a performance of a CoMP operation.

TABLE 16

| Priority | Omission rule | Priority | Omission rule |
|---|---|---|---|
| Priority 0: | Part 2 WB CSI for TP from 1 to N | Priority 0: | Part 2 WB CSI for TP 1 |
| Priority 1: | Part 2 even SB CSI for TP 1 | Priority 1: | Part 2 even SB CSI for TP 1 |
| Priority 2: | Part 2 even SB CSI for TP 2 | Priority 2: | Part 2 odd SB CSI for TP 1 |
| . | . | . | . |
| . | . | . | . |
| . | . | . | . |
| Priority N: | Part 2 even SB CSI for TP N | Priority 3N − 3: | Part 2 WB CSI for TP N |
| Priority N + 1: | Part 2 odd SB CSI for TP 1 | Priority 3N − 2: | Part 2 even SB CSI for TP N |
| Priority N + 2: | Part 2 odd SB CSI for TP 2 | Priority 3N − 1: | Part 2 odd SB CSI for TP N |
| . | . | | |
| . | . | | |
| . | . | | |
| Priority 2N: | Part 2 odd SB CSI for TP N | | |

For a partial SB CSI reporting for each TP, a method of distinguishing SB CSI parameters into an even number and an odd number is described, but this is just for the convenience of description and does not limit the scope of the present disclosure. Accordingly, one of the method of configuring partial SB CSI in method 1 described above may be applied. Alternatively, this may be applied to Part 2 SB CSI in the same way as the method applied in Part 1 CSI. Hereinafter, the repeated description is omitted.

In addition, a priority of TP may also be considered in an omission rule for configuring Part 2 information. That is, based on the priority configuration method of TP in method 1 described above, a priority of Part 2 CSI parameters may be configured (defined) according to the priority of TP which is indicated through the explicit or implicit manner. Alternatively, based on a priority for each TP configured through the explicit or implicit manner, an index remapping scheme may be applied, in which an index of TP is provided again, and a priority of Part 2 CSI parameters may be configured (defined). Accordingly, the repeated description is omitted.

Alternatively, in order to increase the reliability of feedback information for each TP as well as considering multiple TPs, an omission rule as represented the right side of Table 16 may be considered. That is, WB CSI and SB CSI for a TP having high priority are transmitted sequentially according to a priority, there is an advantage of improving an accuracy of CSI for the corresponding TP.

For Type I CSI feedback mode, a case may occur that a CQI for the second codeword needs to be reported in Part 2 according to a value of RI in Part 1. Therefore, in the case of RI>4, all of PMI and CQI information for the second codeword of Part 2 need to be reported, and a corresponding omission rule needs to be considered.

Table 17 represents an example of Part 2 CSI omission rule of Type I feedback mode.

TABLE 17

| Priority | Omission rule |
| --- | --- |
| Priority 0: | Part 2 WB PMI for TP 1 to N |
| Priority 1: | Part 2 WB $2^{nd}$ CW CQI for TP from 1 to N |
| Priority 2: | Part 2 SB even PMI for TP 1 |
| Priority 3: | Part 2 SB even PMI for TP 2 |
| . | . |
| . | . |
| . | . |
| Priority N + 1: | Part 2 SB even PMI for TP N |
| Priority N + 2: | Part 2 SB even $2^{nd}$ CW CQI for TP 1 |
| Priority 2N: | Part 2 SB even $2^{nd}$ CW CQI for TP 2 |
| . | . |
| . | . |
| . | . |
| Priority 2N + 1: | Part 2 SB even $2^{nd}$ CW CQI for TP N |
| Priority 2N + 2: | Part 2 SB odd PMI for TP 1 |
| Priority 2N + 3: | Part 2 SB odd PMI for TP 2 |
| . | . |
| . | . |
| . | . |
| Priority 3N + 1: | Part 2 SB odd PMI for TP N |
| Priority 3N + 2: | Part 2 SB odd $2^{nd}$ CW CQI for TP 1 |
| Priority 3N + 3: | Part 2 SB odd $2^{nd}$ CW CQI for TP 2 |
| . | . |
| . | . |
| . | . |
| Priority 4N + 1: | Part 2 SB odd $2^{nd}$ CW CQI for TP N |

Referring to Table 17, when Part 2 CSI is configured, information of a WB PMI and a WB CQI for the second CW may be configured as the highest priority. In this case, an order for the WB PMI and the WB CQI for the second CW may be preconfigured/predefined. The order may be identically applied to an order of partial SB PMI and SB CQI.

As such, based on WB CSI of each CSI parameter, a priority of an SB PMI and an SB CQI of the second CW may be designated as a scheme of an odd number or an even number. That is, different from Part 2 information of Type II CSI feedback, Part 2 information of Type I CSI feedback has two types including a PMI and a CQI of the second CW, after a priority of the PMI and the CQI is configured, a priority configuration (definition) for the SB PMI and the SB CQI of the second CW may be determined according to method 2 described above.

In addition, a priority of TP may also be considered in an omission rule for Part 2 CSI of Type I feedback mode. That is, based on the priority configuration method of TP in method 1 described above, a priority of Part 2 CSI parameters may be configured (defined) according to the priority of TP which is indicated through the explicit or implicit manner. Alternatively, based on a priority for each TP configured through the explicit or implicit manner, an index remapping scheme may be applied, in which an index of TP is provided again, and a priority of Part 2 CSI parameters may be configured (defined). Accordingly, the repeated description is omitted.

Furthermore, an indicator indicating whether to select a certain CSI omission rule to operate (or an object (operation) to reflect a priority and a new index as a result of remapping for an index of an existing TP need to be informed to a UE. Accordingly, a TP may transmit the indicator and/or information related to a priority of TP to a base station.

In addition, in method 1 and method 2 described above, each CSI omission rule may be independently configured or applied.

<Method 3>

Method 1 and method 2 described above describe an CSI omission rule in a situation configured/indicated to the same BWP in an RRC setting of TPs operating in CoMP.

Additionally, a CoMP operation of each TP having different RRC settings may be considered. In the case that multiple TPs have different RRC settings, a common BWP of TPs operating a CoMP operation and an independent BWP for each TP may be configured.

FIG. 10 illustrates an example in which different RRC settings are configured for three TPs.

Referring to FIG. 10, due to different RRC settings of respective TPs, a situation may be considered in which different BWPs are allocated to three TPs operation in CoMP operation. Here, a BWP region commonly allocated to all or a part of TPs may be distinguished from a BWP independently allocated to each TP.

In this case, a UE may configure (generate) SB CSI for each TP according to a BWP.

Based on method 1 and method 2 described above, SB CSI of a common and/or independent BWP may be generated distinguishably from i) even number/odd number SB CSI of the common BWP region and ii) even number/odd number SB CSI of the independent BWP region.

For a partial SB CSI reporting, a method of distinguishing SB CSI parameters into an even number and an odd number is described, but this is just for the convenience of description and does not limit the scope of the present disclosure. Accordingly, one of the method of configuring partial SB CSI in method 1 described above may be applied. Alternatively, the partial SB CSI reporting method for each TP may be arbitrarily designated. Hereinafter, the repeated description is omitted.

In this case, a TP may instruct a TP to operate an omission for the common and/or independent BWP for each TP. For example, an indication for SB CSI reporting operation considering the common BWP region may be represented by a bitmap utilizing 0 and 1. When (TP1, TP2, TP3)=(0, 1, 1), an omission rule for the common BWP region may not applied to CSI for TP 1, but the omission rule for SB CSI parameter may be applied and generated according to methods 1 and 2 described above.

That is, an omission rule for SB CSI parameters in the common/independent BWP region for multiple TPs may be configured. In addition, based on method 1 and method 2 described above, an omission rule for SB CSI for each base station may be configured, and the omission rule may be applied to a CQI, a PMI, and the like including SB information in configuring CSI parameters for each CSI feedback type and part. Furthermore, according to an instruction of TP, an omission rule applied to the common and/or independent BWP for each TP.

Table 18 represents an example of Part 1 omission rule when different RRC settings are configured for respective TPs. Table 18 is configured based on Table 14 of method 1.

TABLE 18

| Priority | Omission rule |
| --- | --- |
| Priority 0: | RI for TP 1 to N |
| Priority 1: | Part 1 common WB CQI for TP from 1 to N |
| Priority 2: | Part 1 indep. WB CQI for TP 1 |
| . | . |
| . | . |
| . | . |
| Priority N + 1: | Part 1 indep. WB CQI for TP N |
| Priority N + 2: | Part 1 CRI or $N_{IND}$ for TP from 1 to N |
| Priority N + 3: | Part 1 common SB even CQI from 1 to N |
| Priority N + 4: | Part 1 indep. SB even CQI for TP 1 |
| Priority N + 5: | Part 1 indep. SB even CQI for TP 2 |
| . | . |
| . | . |
| . | . |
| Priority 2N + 3: | Part 1 indep. SB even CQI for TP N |
| Priority 2N + 4: | Part 1 common SB odd CQI from 1 to N |
| Priority 2N + 5: | Part 1 indep. SB odd CQI for TP 1 |
| Priority 2N + 6: | Part 1 indep. SB odd CQI for TP 2 |
| . | . |
| . | . |
| . | . |
| Priority 3N + 4: | Part 1 indep. SB odd CQI for TP N |

Referring to Table 18, WB CQI corresponding to a common BWP region of entire TPs operating in CoMP may be configured as priority 1, and a WB CQI of an independent BWP region for each base station may be configured as priority 2 to priority N+1. Based on the priority of a WB CQI, a priority of a partial SB CQI may be preferentially configured as an SB CQI corresponding to a common BWP region in the order of a WB CQI, and then, an SB CQI for each base station of an independent BWP may be configured as CSI. The omission rule may be identified in 'priority N+3' of Table 18. However, this is just for the convenience of description and does not limit the scope of the present disclosure. Accordingly, a higher priority may be configured to a WB CQI for the independent BWP, and a lower priority may be configured to a WB CQI for the common BWP.

Therefore, in the case that different RRC settings are indicated/configured from a TP, an omission rule may be configured according to a specific priority of the common and/or independent BWP CSI parameters for method 1 and/or method 2 described above based on the operation of method 3. In this case, an indicator indicating whether an omission rule for each BWP is applied may be configured based on information for different RRC settings, and a UE may know the omission rule to generate CSI through the indicator.

Alternatively, in the case that a size of the common BWP region of TPs is smaller than a size of the independent BWP region for each TP, except an SB CSI report corresponding to the common BWP, an SB CSI reporting of each TP may be performed for the independent BWP. For example, in the case that a size of the common BWP is smaller than a predefined (promised) reference size 'X', an operation of excluding the SB CSI report corresponding to the common BWP may be instructed through triggering or an indicator.

In addition, in the case that a size of SB CSI for each base station is different, the SB CSI may be transmitted by utilizing an indicator for a start point of the SB CSI for each base station for the common BWP region and length information of the corresponding region to a base station.

FIG. 11 illustrates an example of an operation flowchart of a base station that receives CSI to which a method proposed in the present disclosure may be applied. FIG. 11 is illustrated just for the convenience of description and does not limit the scope of the present disclosure.

Referring to FIG. 11, it is assumed the case that a UE and/or a base station operate based on the method and/or the embodiments of method 1 to method 3 described above. Some of the steps described in FIG. 11 may be merged or omitted. In addition, in performing the procedures described below, the CSI related operation shown in FIG. 8 may be considered/applied.

The base station may transmit at least one information of system information (SI), scheduling information, CSI related configuration information (e.g., CSI reporting setting, CSI-RS resource setting, etc.) to the UE through a higher layer signaling (e.g., RRC or MAC CE) (step, S1110).

For example, the CSI related configuration information may include information related to method 1 to method 3 described above. The CSI related configuration information may include quantization related configuration information for channel information for each layer/RI, configuration information related to Part 1 CSI and Part 2 CSI, information for a CSI omission rule for each base station, and the like.

In addition, the CSI related configuration information may include an indication related to the CSI omission rule according to method 1 to method 3 described above for a next CSI reporting.

Furthermore, the CSI related configuration information may also include information related to a priority for each base station. The information related to a priority for each base station may be based on method 1 described above. As a specific example, the base station may represent a priority of each base station explicitly to the UE and transmit the information related to a priority for each base station. In this case, the priority of each base station may correspond to an index of each base station. Alternatively, the base station may determine a priority of each base station based on information of a WB CQI (e.g., WB CQI size for each base station, etc.) reported by the UE and transmit the corresponding information. Alternatively, the base station may transmit an implicit instruction to determine a priority of each base station by a WB CQI to the UE. Alternatively, the base station may transmit a preconfigured index of each base station (e.g., TP 1 to TP N) with an instruction to utilize a priority of base station to the UE. Accordingly, the UE may map TP 1 to a high priority and map TP N to a lower priority. Alternatively, based on a priority for each base station configured through an explicit or implicit manner, the base station may perform an index remapping that provides an index of the base station again and inform the index to the UE.

In addition, different BWPs are configured by an RRC setting/configuration for each base station, a CSI omission rule may be configured based on method 3 described above. Accordingly, the base station may inform an omission rule to apply in a common/independent BWP to the UE. As a specific example, the base station may transmit information informing whether the CSI omission rule according to methods 1 and 2 is applied in a bitmap scheme in a common BWP or the CSI omission rule according to method 3 is applied through the CSI related configuration information.

The base station may transmit a reference signal (e.g., SSB/CSI-RS/TRS/PT-RS, etc.) for a channel state information measurement to the UE (step, S1120). In addition, the base station may also transmit an indication for a CSI reporting to the UE (step, S1130). In one example, in the case of aperiodic CSI reporting, the indication may be transmitted through DCI for triggering a CSI reporting. Alternatively, in the case of semi-persistent or periodic CSI reporting, step S1130 may be omitted. In addition, the order of step S1120 and step S1130 may be changed or step S1120 and step S1130 may merged into a single step.

The base station may be feedbacked with channel state information (CSI) (e.g., CRI/RI/CQI/PMI/LI, etc.) from the UE (step, S1140). For example, the base station may receive CSI (e.g., Type II CSI feedback) generated based on the CSI omission rule of methods 1 to 3 described above from the UE.

As a specific example, the CSI/information included in the CSI (e.g., Linear combining coefficient (LCC) matrix, Type II CSI codebook, PMI of Type II CSI, etc.) may be calculated/determined based on quantization bit allocation information and/or quantization scheme information. In addition, the base station may be reported with the quantization bit allocation information and/or the quantization scheme information. Furthermore, according to a size of a reporting container, the CSI may be generated based on the CSI omission rule. In addition, in this case, the CSI may be reported in the form of Part 1 CSI and/or Part 2 CSI.

The base station may determine/calculate data scheduling and precoding based on the CSI (and/or a situation considering other UEs served by the base station) reported from the UE (step, S1150) and may transmit data to which the precoding is applied and a reference signal (e.g., DMRS, TRS, PT-RS, etc.) for data decoding to the UE (step, S1160).

FIG. 12 illustrates an example of an operation flowchart of a UE that transmits CSI to which a method proposed in the present disclosure may be applied. FIG. 12 is illustrated just for the convenience of description and does not limit the scope of the present disclosure.

Referring to FIG. 12, it is assumed the case that a UE and/or a base station operate based on the method and/or the embodiments of method 1 to method 3 described above. In addition, in performing the procedures described below, the CSI related operation shown in FIG. 8 may be considered/applied.

The UE may be supported by multiple base stations, and the multiple base stations may perform a CoMP operation.

The UE may receive CSI related configuration information (e.g., CSI reporting setting) from the base station through a higher layer signaling (e.g., RRC or MAC CE) (step, S1210). The UE may receive the CSI related configuration information for multiple base stations from at least one base station among the multiple base stations operating a CoMP operation.

For example, the CSI related configuration information may include information related to method 1 to method 3 described above. The CSI related configuration information may include configuration information related to Part 1 CSI and Part 2 CSI, information for a CSI omission rule, and the like. Furthermore, the CSI related configuration information may include an indication related to the CSI omission rule according to method 1 to method 3 described above for a next CSI reporting.

In addition, the CSI related configuration information may include information related to priorities of the multiple base stations. The information related to priorities of the multiple base stations may be based on method 1 described above.

As a specific example, the UE may receive the information related to priorities of the multiple base stations that explicitly represents a priority of each base station from the base station. In this case, the priority of each base station may correspond to an index of each base station. Alternatively, based on information of a WB CQI (e.g., WB CQI size for each base station, etc.) reported by the UE, the UE may receive a priority determined by the base station.

Alternatively, the information related to a priority of the multiple base stations may include an instruction for the UE to set a priority of the multiple base stations according to a WB CQI. Alternatively, the information related to a priority of the multiple base stations may include information indicating that a priority of the multiple base stations is set with corresponding to indices of the multiple base stations to the UE. That is, the information related to a priority of the multiple base stations may include an instruction to utilize a preconfigured index of each base station (e.g., TP 1 to TP N) as a priority of the base station. Accordingly, the UE may map TP 1 to a high priority and map TP N to a lower priority. Alternatively, based on a priority for each base station configured through an explicit or implicit manner, the UE may receive an index remapping result that provides an index of the base station again.

In another example, the CSI related configuration information may include a CSI report setting, and in the case that an RRC setting (e.g., CSI report setting) is different for each of the multiple base stations, a common BWP to the multiple base stations and an independent BWP may be configured. Therefore, a CSI omission rule may be configured/defined for each BWP configured to the multiple base stations. In other words, the respective CSI omission rule may be applied to the common BWP and the independent BWP, respectively. In one example, priorities of CSI parameters of the common BWP may be configured higher than priorities of CSI parameters of the independent BWP. Alternatively, the UE may further receive an instruction of whether to apply the CSI omission rule for each BWP or to apply the CSI omission rule for each CSI feedback type and part from the base station.

In addition, the CSI related configuration information may further include information representing a CSI omission rule to be applied by the UE to generate the CSI among a plurality of CSI omission rules.

The UE may receive a reference signal from the base station (step, S1220). The UE may receive a reference signal (e.g., SSB, CSI-RS, TRS, or PT-RS, etc.) for a CSI measurement from the multiple base stations.

In order to report channel state information for multiple channels among multiple base stations that perform a CoMP operation and the UE, the UE may generate CSI by performing a measurement for the multiple channels (step, S1230). The CSI may include information for the multiple channels configured between the multiple base stations and the UE. The CSI may be generated based on a CSI omission rule. For example, the CSI omission rule may be configured/defined based on methods 1 to 3 described above. The CSI omission rule may be determined based on at least one of i) a type of the CSI, ii) a part of the CSI, iii) priority information among CSI parameters and/or iv) priority information among the multiple base stations. In addition, the CSI omission rule may be configured/defined according to a BWP configured for the multiple base stations.

As a specific example, since a CSI parameter is different depending on a type and a part of a CSI reporting, the respective CSI omission rules may be configured/defined. For example, a priority of the CSI omission rule for Part 1 of the CSI may be determined in an order of an RI, a CRI and a CQI. In the CSI omission rule, a priority of wideband CSI parameter may be configured/defined as higher than a priority of a subband CSI parameter. In the CSI omission rule, a priority of a wideband CSI parameter for the entire multiple base stations may be higher than a priority of a subband CSI parameter of a single base station among the multiple base stations. Alternatively, based on a priority of the base station, a priority of a subband CSI parameter of a specific base station among the multiple base stations may be higher than a priority of a wideband CSI parameter of another base station.

In addition, a subband CSI parameter may be divided into two or more groups in a comb form according to a specific rule, and in the CSI omission rule, a priority of a subband CSI parameter of a group for the entire multiple base stations may be higher than a priority of a subband CSI parameter of another group. As a specific example, the specific rule may be configured to distinguish an odd number from an even number of a comb. In this case, a priority of each of an even number (odd number) CSI parameters of the entire base stations may be configured as higher than a priority of an odd number (even number) subband CSI parameter of a base station.

The UE may transmit the CSI to the base station (step, S1240). The base station may correspond to at least one base station of the multiple base stations that perform a CoMP operation. The UE may transmit the CSI to the base station on a single uplink resource. The CSI may correspond to one of Type II CSI reporting or Type I CSI reporting.

FIG. 13 illustrates another example of an operation flowchart of a UE that receives CSI to which a method proposed in the present disclosure may be applied. FIG. 13 is illustrated just for the convenience of description and does not limit the scope of the present disclosure.

Referring to FIG. 13, it is assumed the case that a UE and/or a base station operate based on the method and/or the embodiments of method 1 to method 3 described above. Some of the steps described in FIG. 13 may be merged or omitted. In addition, in performing the procedures described below, the CSI related operation shown in FIG. 8 may be considered/applied.

The UE may receive at least one information of system information (SI), scheduling information, CSI related configuration information (e.g., CSI reporting setting, CSI-RS resource setting, etc.) from the base station through a higher layer signaling (e.g., RRC or MAC CE) (step, S1310).

For example, the CSI related configuration information may include information related to method 1 to method 3 described above. The CSI related configuration information may include quantization related configuration information for channel information for each layer/RI, configuration information related to Part 1 CSI and Part 2 CSI, information for a CSI omission rule for each base station, and the like. In addition, the CSI related configuration information may include an indication related to the CSI omission rule according to method 1 to method 3 described above for a next CSI reporting. Furthermore, the CSI related configuration information may also include information related to a priority for each base station. The information related to a priority for each base station may be based on method 1 described above. Step S1310 may correspond to step S1210 shown in FIG. 12. Hereinafter, the repeated description is omitted.

The UE may receive a reference signal (e.g., SSB/CSI-RS/TRS/PT-RS, etc.) for a channel state information measurement from the base station (step, S1320). In addition, the UE may also receive an indication for a CSI reporting from the base station (step, S1330). In one example, in the case of aperiodic CSI reporting, the indication may be transmitted through DCI for triggering a CSI reporting. Alternatively, in the case of semi-persistent or periodic CSI reporting, step S1330 may be omitted. In addition, the order of step S1320 and step S1330 may be changed or step S1320 and step S1330 may merged into a single step.

The UE may calculate CSI based on information configured from the reference signal and the base station (e.g., information of reporting setting, information indicated by DCI, etc.) and generate CSI (step, S1340).

The CSI may be generated based on a CSI omission rule. For example, the CSI omission rule may be configured/defined based on methods 1 to 3 described above. The CSI omission rule may be differently configured depending on the reporting type and part of the CSI. The CSI omission rule may be configured by considering a priority of the multiple base stations. The CSI omission rule may be configured/defined according to a BWP set to the multiple base stations.

As a specific example, since a CSI parameter is different depending on a type and a part of a CSI reporting, the respective CSI omission rules may be configured/defined. In the CSI omission rule, a priority of wideband CSI parameter may be configured/defined as higher than a priority of a subband CSI parameter. Alternatively, based on a priority of the base station, a priority of a subband CSI parameter of a specific base station among the multiple base stations may be higher than a priority of a wideband CSI parameter of another base station.

In addition, a subband CSI parameter may be divided into two or more groups in a comb form according to a specific rule, and in the CSI omission rule, a priority of a subband CSI parameter of a group for the entire multiple base stations may be higher than a priority of a subband CSI parameter of another group. As a specific example, the specific rule may be configured to distinguish an odd number from an even number of a comb. In this case, a priority of each of an even number (odd number) CSI parameters of the entire base stations may be configured as higher than a priority of an odd number (even number) subband CSI parameter of a base station.

This step may correspond to step S1230. Hereinafter, the repeated description is omitted.

The UE may report the CSI to the base station (step, S1350).

Thereafter, the UE may receive a reference signal (e.g., DMRS, TRS, PT-RS, etc.) for data and data decoding based on data scheduling information from the base station (step, S1360). In this case, the data scheduling and the precoding to be applied to the data may be determined/calculated by the base station based on the CSI reported by the UE, but the CSI is not only reported by the UE.

The operation of the base station and/or the UE (e.g., methods 1 to 3, FIG. 11 to FIG. 13, etc.) may be implemented by a device to be described below (e.g., FIG. 14 to FIG. 18). For example, the base station may correspond to a transmission device, and the UE may correspond to a reception device, and the opposite case may also be considered.

Devices to which the Disclosure May Apply

FIG. 14 is an example of a block diagram illustrating a wireless communication device to which the methods proposed in the present specification may be applied according to embodiment of the disclosure.

Referring to FIG. 14, the wireless communication system may include a first device 1410 and a plurality of second devices 1420 located in an area of the first device 1410.

The first device 1410 may be a base station, a network node, a transmission terminal, a reception terminal, a radio device, a wireless communication device, a vehicle, an autonomous vehicle, a connected car, an unmanned aerial vehicle (UAV) or drone, an artificial intelligence (AI) module, a robot, an augmented reality (AR) device, a virtual reality (VR) device, a mixed reality (MR) device, a hologram device, a public safety device, an MTC device, an IoT device, a medical device, a fintech device (or financial device), a security device, a weather/environment device, or a device related to fourth industrial revolution or 5G service.

The second device 1420 may be a base station, a network node, a transmission terminal, a reception terminal, a radio device, a wireless communication device, a vehicle, an autonomous vehicle, a connected car, an unmanned aerial vehicle (UAV) or drone, an artificial intelligence (AI) module, a robot, an augmented reality (AR) device, a virtual reality (VR) device, a mixed reality (MR) device, a hologram device, a public safety device, an MTC device, an IoT device, a medical device, a fintech device (or financial device), a security device, a weather/environment device, or a device related to fourth industrial revolution or 5G service.

For example, the UE may include a mobile phone, a smart phone, a laptop computer, a digital broadcasting terminal, a personal digital assistants (PDA), a portable multimedia player (PMP), a navigation system, a slate PC, a tablet PC, an Ultrabook, a wearable device, for example, a watch-type terminal (smartwatch), a glass-type terminal (smart glass), or head mounted display (HMD). For example, the HMD may be a display device worn on the head. For example, HMD may be used to implement VR, AR or MR.

For example, the drone may be an unmanned aerial vehicle that may be flown by wireless control signals. For example, the VR device may include a device that implements virtual-world objects or background. For example, the AR device may include a device that connects and implements virtual-world objects or background on real-world objects or background. For example, the MR device may include a device that combines and implements virtual-world objects or background with real-world objects or background. For example, the hologram device may include a device that implements a 360-degree stereoscopic image by recording and reproducing stereoscopic information by utilizing a light interference phenomenon (so-called holography) that occurs when two laser beams meet. For example, the public safety device may include an image relay device or an image device wearable on a user's body. For example, the MTC device and the IoT device may be devices that do not require direct human intervention or manipulation. For example, the MTC device and the IoT device may include a smart meter, a bending machine, a thermometer, a smart light bulb, a door lock, or various sensors. For example, the medical device may be a device used for the purpose of diagnosing, treating, alleviating, treating or preventing a disease. For example, the medical device may be a device used for the purpose of diagnosing, treating, alleviating or correcting an injury or disorder. For example, the medical device may be a device used for the purpose of examining, replacing or modifying a structure or function. For example, the medical device may be a device used for the purpose of controlling pregnancy. For example, the medical device may include a device for treatment, a device for surgery, a device for (in-vitro) diagnosis, a hearing aid or a device for procedure. For example, the security device may be a device installed to prevent possible hazards and maintain safety. For example, the security device may be a camera, CCTV, recorder, or black box. For example, the fintech device may be a device capable of providing financial services such as mobile payment. For example, the fintech device may include a payment device or a point-of-sales (POS) device. For example, the weather/environment device may include a device that monitors or predicts the weather/environment.

The first device 1410 may include at least one or more processors, such as the processor 1411, at least one or more memories, such as the memory 1412, and at least one or more transceivers, such as the transceiver 1413. The processor 1411 may perform the functions, procedures, and/or methods described above. The processor 1411 may perform one or more protocols. For example, the processor 1411 may perform one or more layers of the air interface protocol. The memory 1412 may be connected to the processor 1411 and may store various types of information and/or commands. The transceiver 1413 may be connected to the processor 1411 and be controlled to transmit and receive wireless signals.

As a specific example, the processor 1411 may control the transceiver 1413 to transmit the CSI related configuration information to the second device 1420 (step, S1110). For example, the CSI related configuration information may include information related to a CSI omission rule for generating the CSI.

In addition, the processor 1411 may control the transceiver 1413 to receive channel state information (CSI) from the second device 1420 (step, S1140). For example, the CSI may be generated based on the CSI omission rule.

The second device 1420 may include at least one processor such as a processor 1421, at least one memory such as a memory 1422, and at least one transceiver such as a transceiver 1423. The processor 1421 may perform functions, procedures, and/or methods described above. The processor 1421 may perform one or more protocols. For example, the processor 1421 may perform one or more layers of a radio interface protocol. The memory 1422 is connected to the processor 1421 and may store various types of information and/or instructions. The transceiver 1423 is connected to the processor 1421 and may be configured to transmit and receive radio signals.

As a specific example, the processor 1421 may control the transceiver 1423 to receive the CSI related configuration information (step, S1210). In addition, the processor 1421 control the transceiver 1423 to receive a reference signal for a CSI measurement (step, S1220). Furthermore, the processor 1421 may generate CSI (step, S1230). The CSI may be generated based on a CSI omission rule. For example, the CSI omission rule may be configured/defined based on methods 1 to 3 described above. The CSI omission rule may be differently configured depending on the reporting type and part of the CSI. The CSI omission rule may be configured by considering a priority of the multiple base stations. The CSI omission rule may be configured/defined according to a BWP set to the multiple base stations. In addition, the processor 1421 may control the transceiver 1423 to transmit the CSI to the first device 1410 (step, S1240).

The memory 1412 and/or the memory 1422 may be connected inside or outside the processor 1411 and/or the processor 1421, respectively, and may be connected to another processor through various technologies, such as a wired or wireless connection.

The first device 1410 and/or the second device 1420 may have one or more antennas. For example, an antenna 1414 and/or an antenna 1424 may be configured to transmit and receive radio signals.

FIG. 15 is an another example of a block diagram illustrating a wireless communication device to which the methods proposed in the present specification may be applied according to embodiment of the disclosure.

Referring to FIG. 15, the wireless communication system includes a base station 1510 and a plurality of UEs 1520 located in the area of the base station. The base station may be expressed as a transmitter, and the UE may be expressed as a receiver, and vice versa. The base station and UE include processors 1511 and 1521, memories 1514 and 1524, one or more Tx/Rx radio frequency (RF) modules 1515 and 1525, Tx processors 1512 and 1522, Rx processors 1513 and 1523, and antennas 1516 and 1526. The processor implements the above-described functions, processes, and/ or methods. Specifically, on DL (communication from the base station to the UE), higher layer packets are provided from a core network to the processor 1511. The processor implements L2 layer functions. On DL, the processor is in charge of multiplexing between the logical channel and transport channel, radio resource allocation for the UE, and signaling to the UE. The Tx processor 1512 implements various signal processing functions on the L1 layer (i.e., the physical layer). The signal processing functions allow for easier forward error correction (FEC) in the UE and include coding and interleaving. Coded and modulated symbols are split into parallel streams, and each stream is mapped to an OFDM subcarrier, is multiplexed with a reference signal (RS) in the time and/or frequency domain, and they are then merged together by inverse fast Fourier transform (IFFT), thereby generating a physical channel for carrying time domain OFDMA symbol streams. The OFDM streams are spatially precoded to generate multiple spatial streams. Each spatial stream may be provided to a different antenna 1516 via an individual Tx/Rx module (or transceiver 1515). Each Tx/Rx module may modulate the RF carrier into each spatial stream for transmission. In the UE, each Tx/Rx module (or transceiver 1525) receives signals via its respective antenna 1526. Each Tx/Rx module reconstructs the information modulated with the RF carrier and provides the reconstructed signal or information to the Rx processor 1523. The Rx processor implements various signal processing functions of layer 1. The Rx processor may perform spatial processing on the information for reconstructing any spatial stream travelling to the UE. Where multiple spatial streams travel to the UE, they may be merged into a single OFDMA symbol stream by multiple Rx processors. The Rx processor transforms the OFDMA symbol stream from the time domain to frequency domain using fast Fourier transform (FFT). The frequency domain signal contains an individual OFDMA symbol stream for each subcarrier of the OFDM signal. The reference signal and symbols on each subcarrier are reconstructed and demodulated by determining signal array points that are most probable as transmitted from the baseband signal. Such soft decisions may be based on channel estimations. Soft decisions are decoded and deinterleaved to reconstruct the original data and control signal transmitted by the base station on the physical channel. The data and control signal are provided to the processor 1521.

UL (communication from the UE to the base station) is handled by the base station 1510 in a similar manner to those described above in connection with the functions of the receiver in the UE 1520. Each Tx/Rx module 1525 receives signals via its respective antenna 1526. Each Tx/Rx module provides RF carrier and information to the Rx processor 1523. The processor 1521 may be related to the memory 1524 that stores program code and data. The memory may be referred to as a computer readable medium.

FIG. 16 illustrates an AI device 100 according to an embodiment of the disclosure.

The AI device 100 may be implemented as a fixed device or mobile device, such as TV, a projector, a mobile phone, a smartphone, a desktop computer, a notebook, a terminal for digital broadcasting, a personal digital assistants (PDA), a portable multimedia player (PMP), a navigator, a tablet PC, a wearable device, a set-top box (STB), a DMB receiver, a radio, a washing machine, a refrigerator, a desktop computer, a digital signage, a robot, and a vehicle.

Referring to FIG. 16, the terminal 100 may include a communication unit 110, an input unit 120, a learning processor 130, a sensing unit 140, an output unit 150, a memory 170 and a processor 180.

The communication unit 110 may transmit and receive data to and from external devices, such as other AI devices 100a to 100er or an AI server 200, using wired and wireless communication technologies. For example, the communication unit 110 may transmit and receive sensor information, a user input, a learning model, and a control signal to and from external devices.

In this case, communication technologies used by the communication unit 110 include a global system for mobile communication (GSM), code division multi access (CDMA), long term evolution (LTE), 5G, a wireless LAN (WLAN), wireless-fidelity (Wi-Fi), Bluetooth™, radio frequency identification (RFID), infrared data association (IrDA), ZigBee, near field communication (NFC), etc.

The input unit 120 may obtain various types of data.

In this case, the input unit 120 may include a camera for an image signal input, a microphone for receiving an audio signal, a user input unit for receiving information from a user, etc. In this case, the camera or the microphone is treated as a sensor, and a signal obtained from the camera or the microphone may be called sensing data or sensor information.

The input unit 120 may obtain learning data for model learning and input data to be used when an output is obtained using a learning model. The input unit 120 may obtain not-processed input data. In this case, the processor 180 or the learning processor 130 may extract an input feature by performing pre-processing on the input data.

The learning processor 130 may be trained by a model configured with an artificial neural network using learning data. In this case, the trained artificial neural network may be called a learning model. The learning model is used to deduce a result value of new input data not learning data. The deduced value may be used as a base for performing a given operation.

In this case, the learning processor 130 may perform AI processing along with the learning processor 240 of the AI server 200.

In this case, the learning processor 130 may include memory integrated or implemented in the AI device 100. Alternatively, the learning processor 130 may be implemented using the memory 170, external memory directly coupled to the AI device 100 or memory maintained in an external device.

The sensing unit 140 may obtain at least one of internal information of the AI device 100, surrounding environment information of the AI device 100, or user information using various sensors.

In this case, sensors included in the sensing unit 140 include a proximity sensor, an illumination sensor, an acceleration sensor, a magnetic sensor, a gyro sensor, an inertia sensor, an RGB sensor, an IR sensor, a fingerprint recognition sensor, an ultrasonic sensor, a photo sensor, a microphone, LIDAR, and a radar.

The output unit 150 may generate an output related to a visual sense, an auditory sense or a tactile sense.

In this case, the output unit 150 may include a display unit for outputting visual information, a speaker for outputting auditory information, and a haptic module for outputting tactile information.

The memory 170 may store data supporting various functions of the AI device 100. For example, the memory 170 may store input data obtained by the input unit 120, learning data, a learning model, a learning history, etc.

The processor 180 may determine at least one executable operation of the AI device 100 based on information, determined or generated using a data analysis algorithm or a machine learning algorithm. Furthermore, the processor 180 may perform the determined operation by controlling elements of the AI device 100.

To this end, the processor 180 may request, search, receive, and use the data of the learning processor 130 or the memory 170, and may control elements of the AI device 100 to execute a predicted operation or an operation determined to be preferred, among the at least one executable operation.

In this case, if association with an external device is necessary to perform the determined operation, the processor 180 may generate a control signal for controlling the corresponding external device and transmit the generated control signal to the corresponding external device.

The processor 180 may obtain intention information for a user input and transmit user requirements based on the obtained intention information.

In this case, the processor 180 may obtain the intention information, corresponding to the user input, using at least one of a speech to text (STT) engine for converting a voice input into a text string or a natural language processing (NLP) engine for obtaining intention information of a natural language.

In this case, at least some of at least one of the STT engine or the NLP engine may be configured as an artificial neural network trained based on a machine learning algorithm. Furthermore, at least one of the STT engine or the NLP engine may have been trained by the learning processor 130, may have been trained by the learning processor 240 of the AI server 200 or may have been trained by distributed processing thereof.

The processor 180 may collect history information including the operation contents of the AI device 100 or the feedback of a user for an operation, may store the history information in the memory 170 or the learning processor 130, or may transmit the history information to an external device, such as the AI server 200. The collected history information may be used to update a learning model.

The processor 18 may control at least some of the elements of the AI device 100 in order to execute an application program stored in the memory 170. Moreover, the processor 180 may combine and drive two or more of the elements included in the AI device 100 in order to execute the application program.

FIG. 17 illustrates an AI server 200 according to an embodiment of the disclosure.

Referring to FIG. 17, the AI server 200 may mean a device which is trained by an artificial neural network using a machine learning algorithm or which uses a trained artificial neural network. In this case, the AI server 200 is configured with a plurality of servers and may perform distributed processing and may be defined as a 5G network. In this case, the AI server 200 may be included as a partial configuration of the AI device 100, and may perform at least some of AI processing.

The AI server 200 may include a communication unit 210, a memory 230, a learning processor 240 and a processor 260.

The communication unit 210 may transmit and receive data to and from an external device, such as the AI device 100.

The memory 230 may include a model storage unit 231. The model storage unit 231 may store a model (or artificial neural network 231a) which is being trained or has been trained through the learning processor 240.

The learning processor 240 may train the artificial neural network 231a using learning data. The learning model may be used in the state in which it has been mounted on the AI server 200 of the artificial neural network or may be mounted on an external device, such as the AI device 100, and used.

The learning model may be implemented as hardware, software or a combination of hardware and software. If some of or the entire learning model is implemented as software, one or more instructions configuring the learning model may be stored in the memory 230.

The processor 260 may deduce a result value of new input data using the learning model, and may generate a response or control command based on the deduced result value.

FIG. 18 illustrates an AI system 1 according to an embodiment of the disclosure.

Referring to FIG. 18, the AI system 1 is connected to at least one of the AI server 200, a robot 100a, a self-driving vehicle 100b, an XR device 100c, a smartphone 100d or home appliances 100e over a cloud network 10. In this case, the robot 100a, the self-driving vehicle 100b, the XR device 100c, the smartphone 100d or the home appliances 100e to which the AI technology has been applied may be called AI devices 100a to 100e.

The cloud network 10 may configure part of cloud computing infra or may mean a network present within cloud computing infra. In this case, the cloud network 10 may be configured using the 3G network, the 4G or long term evolution (LTE) network or the 5G network.

That is, the devices 100a to 100e (200) configuring the AI system 1 may be interconnected over the cloud network 10. Particularly, the devices 100a to 100e and 200 may communicate with each other through a base station, but may directly communicate with each other without the intervention of a base station.

The AI server 200 may include a server for performing AI processing and a server for performing calculation on big data.

The AI server 200 is connected to at least one of the robot 100a, the self-driving vehicle 100b, the XR device 100c, the smartphone 100d or the home appliances 100e, that is, AI devices configuring the AI system 1, over the cloud network 10, and may help at least some of the AI processing of the connected AI devices 100a to 100e.

In this case, the AI server 200 may train an artificial neural network based on a machine learning algorithm in place of the AI devices 100a to 100e, may directly store a learning model or may transmit the learning model to the AI devices 100a to 100e.

In this case, the AI server 200 may receive input data from the AI devices 100a to 100e, may deduce a result value of the received input data using the learning model, may generate a response or control command based on the deduced result value, and may transmit the response or control command to the AI devices 100a to 100e.

Alternatively, the AI devices 100a to 100e may directly deduce a result value of input data using a learning model, and may generate a response or control command based on the deduced result value.

Hereinafter, various embodiments of the AI devices 100a to 100e to which the above-described technology is applied are described. In this case, the AI devices 100a to 100e shown in FIG. 18 may be considered to be detailed embodiments of the AI device 100 shown in FIG. 1.

AI+Robot to which the Disclosure can be Applied

An AI technology is applied to the robot 100a, and the robot 100a may be implemented as a guidance robot, a transport robot, a cleaning robot, a wearable robot, an entertainment robot, a pet robot, an unmanned flight robot, etc.

The robot 100a may include a robot control module for controlling an operation. The robot control module may mean a software module or a chip in which a software module has been implemented using hardware.

The robot 100a may obtain state information of the robot 100a, may detect (recognize) a surrounding environment and object, may generate map data, may determine a moving path and a running plan, may determine a response to a user interaction, or may determine an operation using sensor information obtained from various types of sensors.

In this case, the robot 100a may use sensor information obtained by at least one sensor among LIDAR, a radar, and a camera in order to determine the moving path and running plan.

The robot 100a may perform the above operations using a learning model configured with at least one artificial neural network. For example, the robot 100a may recognize a surrounding environment and object using a learning model, and may determine an operation using recognized surrounding environment information or object information. In this case, the learning model may have been directly trained in the robot 100a or may have been trained in an external device, such as the AI server 200.

In this case, the robot 100a may directly generate results using the learning model and perform an operation, but may perform an operation by transmitting sensor information to an external device, such as the AI server 200, and receiving results generated in response thereto.

The robot 100a may determine a moving path and running plan using at least one of map data, object information detected from sensor information, or object information obtained from an external device. The robot 100a may run along the determined moving path and running plan by controlling the driving unit.

The map data may include object identification information for various objects disposed in the space in which the robot 100a moves. For example, the map data may include object identification information for fixed objects, such as a wall and a door, and movable objects, such as a flowport and a desk. Furthermore, the object identification information may include a name, a type, a distance, a location, etc.

Furthermore, the robot 100a may perform an operation or run by controlling the driving unit based on a user's control/interaction. In this case, the robot 100a may obtain intention information of an interaction according to a user's behavior or voice speaking, may determine a response based on the obtained intention information, and may perform an operation.

AI+Self-Driving to which the Disclosure can be Applied

An AI technology is applied to the self-driving vehicle 100b, and the self-driving vehicle 100b may be implemented as a movable type robot, a vehicle, an unmanned flight body, etc.

The self-driving vehicle 100b may include a self-driving control module for controlling a self-driving function. The self-driving control module may mean a software module or a chip in which a software module has been implemented using hardware. The self-driving control module may be included in the self-driving vehicle 100b as an element of the self-driving vehicle 100b, but may be configured as separate hardware outside the self-driving vehicle 100b and connected to the self-driving vehicle 100b.

The self-driving vehicle 100b may obtain state information of the self-driving vehicle 100b, may detect (recognize) a surrounding environment and object, may generate map data, may determine a moving path and running plan, or may determine an operation using sensor information obtained from various types of sensors.

In this case, in order to determine the moving path and running plan, like the robot 100a, the self-driving vehicle 100b may use sensor information obtained from at least one sensor among LIDAR, a radar and a camera.

Particularly, the self-driving vehicle 100b may recognize an environment or object in an area whose view is blocked or an area of a given distance or more by receiving sensor information for the environment or object from external devices, or may directly receive recognized information for the environment or object from external devices.

The self-driving vehicle 100b may perform the above operations using a learning model configured with at least one artificial neural network. For example, the self-driving vehicle 100b may recognize a surrounding environment and object using a learning model, and may determine the flow of running using recognized surrounding environment information or object information. In this case, the learning model may have been directly trained in the self-driving vehicle 100b or may have been trained in an external device, such as the AI server 200.

In this case, the self-driving vehicle 100b may directly generate results using the learning model and perform an operation, but may perform an operation by transmitting sensor information to an external device, such as the AI server 200, and receiving results generated in response thereto.

The self-driving vehicle 100b may determine a moving path and running plan using at least one of map data, object information detected from sensor information or object information obtained from an external device. The self-driving vehicle 100b may run based on the determined moving path and running plan by controlling the driving unit.

The map data may include object identification information for various objects disposed in the space (e.g., road) in which the self-driving vehicle 100b runs. For example, the map data may include object identification information for fixed objects, such as a streetlight, a rock, and a building, etc., and movable objects, such as a vehicle and a pedestrian. Furthermore, the object identification information may include a name, a type, a distance, a location, etc.

Furthermore, the self-driving vehicle 100b may perform an operation or may run by controlling the driving unit based on a user's control/interaction. In this case, the self-driving vehicle 100b may obtain intention information of an interaction according to a user' behavior or voice speaking, may determine a response based on the obtained intention information, and may perform an operation.

AI+XR to which the Disclosure can be Applied

An AI technology is applied to the XR device 100c, and the XR device 100c may be implemented as a head-mount display, a head-up display provided in a vehicle, television, a mobile phone, a smartphone, a computer, a wearable device, home appliances, a digital signage, a vehicle, a fixed type robot or a movable type robot.

The XR device 100c may generate location data and attributes data for three-dimensional points by analyzing three-dimensional point cloud data or image data obtained through various sensors or from an external device, may obtain information on a surrounding space or real object based on the generated location data and attributes data, and may output an XR object by rendering the XR object. For example, the XR device 100c may output an XR object, including additional information for a recognized object, by making the XR object correspond to the corresponding recognized object.

The XR device 100c may perform the above operations using a learning model configured with at least one artificial neural network. For example, the XR device 100c may recognize a real object in three-dimensional point cloud data or image data using a learning model, and may provide information corresponding to the recognized real object. In this case, the learning model may have been directly trained in the XR device 100c or may have been trained in an external device, such as the AI server 200.

In this case, the XR device 100c may directly generate results using a learning model and perform an operation, but may perform an operation by transmitting sensor information to an external device, such as the AI server 200, and receiving results generated in response thereto.

AI+Robot+Self-Driving to which the Disclosure can be Applied

An AI technology and a self-driving technology are applied to the robot 100a, and the robot 100a may be implemented as a guidance robot, a transport robot, a cleaning robot, a wearable robot, an entertainment robot, a pet robot, an unmanned flight robot, etc.

The robot 100a to which the AI technology and the self-driving technology have been applied may mean a robot itself having a self-driving function or may mean the robot 100a interacting with the self-driving vehicle 100b.

The robot 100a having the self-driving function may collectively refer to devices that autonomously move along a given flow without control of a user or autonomously determine a flow and move.

The robot 100a and the self-driving vehicle 100b having the self-driving function may use a common sensing method in order to determine one or more of a moving path or a running plan. For example, the robot 100a and the self-driving vehicle 100b having the self-driving function may determine one or more of a moving path or a running plan using information sensed through LIDAR, a radar, a camera, etc.

The robot 100a interacting with the self-driving vehicle 100b is present separately from the self-driving vehicle 100b, and may perform an operation associated with a self-driving function inside or outside the self-driving vehicle 100b or associated with a user got in the self-driving vehicle 100b.

In this case, the robot 100a interacting with the self-driving vehicle 100b may control or assist the self-driving function of the self-driving vehicle 100b by obtaining sensor information in place of the self-driving vehicle 100b and providing the sensor information to the self-driving vehicle 100b, or by obtaining sensor information, generating surrounding environment information or object information, and providing the surrounding environment information or object information to the self-driving vehicle 100b.

Alternatively, the robot 100a interacting with the self-driving vehicle 100b may control the function of the self-driving vehicle 100b by monitoring a user got in the self-driving vehicle 100b or through an interaction with a user. For example, if a driver is determined to be a drowsiness state, the robot 100a may activate the self-driving function of the self-driving vehicle 100b or assist control of the driving unit of the self-driving vehicle 100b. In this case, the function of the self-driving vehicle 100b controlled by the robot 100a may include a function provided by a navigation system or audio system provided within the self-driving vehicle 100b, in addition to a self-driving function simply.

Alternatively, the robot 100a interacting with the self-driving vehicle 100b may provide information to the self-driving vehicle 100b or may assist a function outside the self-driving vehicle 100b. For example, the robot 100a may provide the self-driving vehicle 100b with traffic information, including signal information, as in a smart traffic light, and may automatically connect an electric charger to a filling inlet through an interaction with the self-driving vehicle 100b as in the automatic electric charger of an electric vehicle.

AI+Robot+XR to which the Disclosure can be Applied

An AI technology and an XR technology are applied to the robot 100a, and the robot 100a may be implemented as a guidance robot, a transport robot, a cleaning robot, a wearable robot, an entertainment robot, a pet robot, an unmanned flight robot, a drone, etc.

The robot 100a to which the XR technology has been applied may mean a robot, that is, a target of control/interaction within an XR image. In this case, the robot 100a is different from the XR device 100c, and they may operate in conjunction with each other.

When the robot 100a, that is, a target of control/interaction within an XR image, obtains sensor information from sensors including a camera, the robot 100a or the XR device 100c may generate an XR image based on the sensor information, and the XR device 100c may output the generated XR image. Furthermore, the robot 100a may operate based on a control signal received through the XR device 100c or a user's interaction.

For example, a user may identify a corresponding XR image at timing of the robot 100a, remotely operating in conjunction through an external device, such as the XR device 100c, may adjust the self-driving path of the robot 100a through an interaction, may control an operation or driving, or may identify information of a surrounding object.

AI+Self-Driving+XR to which the Disclosure can be Applied

An AI technology and an XR technology are applied to the self-driving vehicle 100b, and the self-driving vehicle 100b may be implemented as a movable type robot, a vehicle, an unmanned flight body, etc.

The self-driving vehicle 100b to which the XR technology has been applied may mean a self-driving vehicle equipped with means for providing an XR image or a self-driving vehicle, that is, a target of control/interaction within an XR image. Particularly, the self-driving vehicle 100b, that is, a target of control/interaction within an XR image, is different from the XR device 100c, and they may operate in conjunction with each other.

The self-driving vehicle 100b equipped with the means for providing an XR image may obtain sensor information from sensors including a camera, and may output an XR image generated based on the obtained sensor information. For example, the self-driving vehicle 100b includes an HUD, and may provide a passenger with an XR object corresponding to a real object or an object within a screen by outputting an XR image.

In this case, when the XR object is output to the HUD, at least some of the XR object may be output with it overlapping a real object toward which a passenger's view is directed. In contrast, when the XR object is displayed on a display included within the self-driving vehicle 100b, at least some of the XR object may be output so that it overlaps an object within a screen. For example, the self-driving vehicle 100b may output XR objects corresponding to objects, such as a carriageway, another vehicle, a traffic light, a signpost, a two-wheeled vehicle, a pedestrian, and a building.

When the self-driving vehicle 100b, that is, a target of control/interaction within an XR image, obtains sensor information from sensors including a camera, the self-driving vehicle 100b or the XR device 100c may generate an XR image based on the sensor information. The XR device 100c may output the generated XR image. Furthermore, the self-driving vehicle 100b may operate based on a control signal received through an external device, such as the XR device 100c, or a user's interaction.

The embodiments described above are implemented by combinations of components and features of the disclosure in predetermined forms. Each component or feature should be considered selectively unless specified separately. Each component or feature may be carried out without being combined with another component or feature. Moreover, some components and/or features are combined with each other and can implement embodiments of the disclosure. The order of operations described in embodiments of the disclosure may be changed. Some components or features of one embodiment may be included in another embodiment, or may be replaced by corresponding components or features of another embodiment. It is apparent that some claims referring to specific claims may be combined with another claims referring to the claims other than the specific claims to constitute the embodiment or add new claims by means of amendment after the application is filed.

Embodiments of the disclosure can be implemented by various means, for example, hardware, firmware, software, or combinations thereof. When embodiments are implemented by hardware, one embodiment of the disclosure can be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, and the like.

When embodiments are implemented by firmware or software, one embodiment of the disclosure can be implemented by modules, procedures, functions, etc. performing functions or operations described above. Software code can be stored in a memory and can be driven by a processor. The memory is provided inside or outside the processor and can exchange data with the processor by various well-known means.

It is apparent to those skilled in the art that the disclosure can be embodied in other specific forms without departing from essential features of the disclosure. Accordingly, the aforementioned detailed description should not be construed as limiting in all aspects and should be considered as illustrative. The scope of the disclosure should be determined by rational construing of the appended claims, and all modifications within an equivalent scope of the disclosure are included in the scope of the disclosure.

INDUSTRIAL APPLICABILITY

Although the method for transmitting channel state information in a wireless communication system of the present disclosure has been described focusing on examples applying to the 3GPP LTE/LTE-A system and 5G system (New RAT system), the present disclosure can be applied to various wireless communication systems other than the 3GPP LTE/LTE-A system and 5G system (New RAT system).

The invention claimed is:

1. A method for reporting channel state information (CSI) performed by a user equipment (UE) in a wireless communication system, comprising:
   receiving CSI related configuration information from a base station, wherein the CSI related configuration information includes a CSI reporting-related configuration that includes information for a report type which is related to a time domain behavior for the reporting of the CSI;
   receiving a reference signal from a base station;
   generating CSI based on the reference signal, wherein the CSI is generated based on a measurement of the reference signal; and
   transmitting the CSI to the base station, wherein the CSI is transmitted periodically, aperiodically or semi-persistently, based on the report type,
   wherein, based on the report type being related to periodic CSI reporting, the CSI is transmitted on a Physical Uplink Control Channel (PUCCH),
   wherein, based on the report type being related to aperiodic CSI reporting, the CSI is transmitted on a Physical Uplink Shared Channel (PUSCH),
   wherein, based on the report type being related to semi-persistent CSI reporting, the CSI is transmitted on the PUCCH or the PUSCH,
   wherein the CSI includes i) information for CSI Part 1 which includes at least one of a Rank Indicator (RI), a CSI-RS Resource Indicator (CRI) or a Channel Quality Indicator (CQI) and ii) information for CSI part 2 which includes a Precoding Matrix Indicator (PMI),
   wherein, based on some of the information for CSI part 2 being omitted in the CSI, the omission of the information for CSI part 2 is based on a pre-defined priority,
   wherein, based on the base station being based on multiple points that transmit and receiving a signal:
   the reference signal is received from each of the multiple points,
   the CSI is transmitted to at least one of the multiple points, and
   the information for CSI Part 1 further includes a Wide-Band (WB) CQI for the multiple points and a SubBand (SB) CQI for each of the multiple points,
   wherein based on some of the information for CSI part 1 being omitted in the CSI, the omission of the information for CSI part 1 is based on a priority related to omission of the CSI part 1, and
   wherein the priority related to the omission of the CSI part 1 is configured such that a priority of the WB CQI for the multiple points is higher than a priority of the SB CQI for each of the multiple points.

2. The method of claim 1, wherein the CSI is transmitted on a single uplink resource.

3. The method of claim 1, wherein the SB CQI for each of the multiple points is divided into two or more groups depending on a pre-defined rule in a comb form, and
   wherein the priority related to the omission of the CSI part 1 is configured such that priority of a SB CQI of a group for an even numbered SB CQI is higher than a priority of a SB CQI of a group for an odd numbered SB CQI.

4. The method of claim 1, wherein the priority related to omission of the CSI part 1 is determined in order of the RI, the CRI and the CQI.

5. The method of claim 1, wherein, based on the information for CSI Part 1 further including a WB CQI for each of the multiple points, the priority related to the omission of the CSI part 1 is configured such that priority of a SB CQI for a pre-defined point among the multiple points is higher than a priority of the WB CQI for another point.

6. The method of claim 1, wherein the CSI related configuration information includes information related to a priority of the multiple points.

7. The method of claim 6, wherein the information related to priority of the multiple points includes an instruction for the UE to set a priority for the multiple points based on a size of a WB CQI for each of the multiple points.

8. The method of claim 6, wherein the information related to priority of the multiple points includes information representing that a priority of the multiple base stations is set based on indices of the multiple points to the UE.

9. The method of claim 1,
wherein, based on the CSI reporting-related configuration being different for each of the multiple points, the WB CQI includes a first WB CQI which is related to a Bandwidth Part (BWP) that is common to the multiple points and a second WB CQI which is related to a BWP that is independent for each of the multiple points, and
wherein the priority related to the omission of the CSI part 1 is configured such that a priority of the first WB CQI is higher than a priority of the second WB CQI.

10. A user equipment (UE) configured to report channel state information (CSI) in a wireless communication system, the UE comprising:
a transceiver for transmitting and receiving a wireless signal; and
a processor functionally connected to the transceiver, wherein the processor is configured to:
control the transceiver to receive CSI related configuration information from a base station, wherein the CSI related configuration information includes a CSI reporting-related configuration that includes information for a report type which is related to a time domain behavior for the reporting of the CSI;
control the transceiver to receive a reference signal from the base station;
generate CSI based on the reference signal, wherein the CSI is generated based on a measurement of the reference signal; and
control the transceiver to transmit the CSI to the base station, wherein the CSI is transmitted periodically, aperiodically or semi-persistently, based on the report type,
wherein, based on the report type being related to periodic CSI reporting, the CSI is transmitted on a Physical Uplink Control Channel (PUCCH),
wherein, based on the report type being related to aperiodic CSI reporting, the CSI is transmitted on a Physical Uplink Shared Channel (PUSCH),
wherein, based on the report type being related to semi-persistent CSI reporting, the CSI is transmitted on the PUCCH or the PUSCH,
wherein the CSI includes i) information for CSI Part 1 which includes at least one of a Rank Indicator (RI), a CSI-RS Resource Indicator (CRI) or a Channel Quality Indicator (CQI) and ii) information for CSI part 2 which includes a Precoding Matrix Indicator (PMI),
wherein, based on some of the information for CSI part 2 being omitted in the CSI, the omission of the information for CSI part 2 is based on a pre-defined priority,
wherein, based on the base station being based on multiple points that transmit and receiving a signal:
the reference signal is received from each of the multiple points,
the CSI is transmitted to at least one of the multiple points, and
the information for CSI Part 1 includes a WideBand (WB) CQI for the multiple points and a SubBand (SB) CQI for each of the multiple points,
wherein, based on some of the information for CSI part 1 being omitted in the CSI, the omission of the information for CSI part 1 is based on a priority related to the omission of the CSI part 1, and
wherein the priority related to the omission of the CSI part 1 is configured such that a priority of the WB CQI for the multiple points is higher than a priority of the SB CQI for each of the multiple points.

11. The UE of claim 10, wherein the CSI is transmitted on a single uplink resource.

12. The UE of claim 10, wherein, based on the information for CSI Part 1 further including a WB CQI for each of the multiple points, the priority related to the omission of the CSI part 1 is configured such that priority of a SB CQI for a pre-defined point among the multiple points is higher than a priority of the WB CQI for another point.

* * * * *